(12) United States Patent
Cho et al.

(10) Patent No.: US 12,110,478 B2
(45) Date of Patent: Oct. 8, 2024

(54) BEVERAGE MAKER

(71) Applicant: LG Electronics Inc., Seoul (KR)

(72) Inventors: Suchang Cho, Seoul (KR); Youngjin Kim, Seoul (KR); Jinpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 701 days.

(21) Appl. No.: 17/332,899

(22) Filed: May 27, 2021

(65) Prior Publication Data

US 2021/0388297 A1    Dec. 16, 2021

(30) Foreign Application Priority Data

Jun. 15, 2020   (KR) .................. 10-2020-0072110

(51) Int. Cl.
*C12C 11/00*    (2006.01)
*C12C 7/26*    (2006.01)
*C12C 13/10*    (2006.01)

(52) U.S. Cl.
CPC .............. *C12C 11/006* (2013.01); *C12C 7/26* (2013.01); *C12C 13/10* (2013.01)

(58) Field of Classification Search
CPC .. B67D 1/0016; B67D 1/0078; B67D 1/0888; B67D 1/0861; B67D 1/00; B67D 1/07; B67D 1/1202; B67D 1/1272; B67D 1/0021; B67D 1/004; B67D 1/0067; B67D 1/0074; B67D 1/0081; B67D 1/04; B67D 1/0431; B67D 1/0437; B67D 1/0462; B67D 1/0805; B67D 1/0882; B67D 1/0895;

(Continued)

(56) References Cited

U.S. PATENT DOCUMENTS

2010/0129490 A1* 5/2010 Williams .............. C12C 11/006
                                                             426/11
2014/0017354 A1* 1/2014 Joseph ...................... C12C 7/04
                                                             99/278

(Continued)

FOREIGN PATENT DOCUMENTS

KR    20170086880    7/2017
KR    20190008735    1/2019

OTHER PUBLICATIONS

Office Action in Korean Appln. No. 10-2020-0072110, dated Nov. 22, 2021, 24 pages (with English translation).

*Primary Examiner* — Chris Q Liu
(74) *Attorney, Agent, or Firm* — Fish & Richardson P.C.

(57) ABSTRACT

Provided is a beverage maker. The beverage maker includes a pair of fermenters, each of which has an internal space, a pair of fermenter lids configured to shield the internal spaces of the pair of fermenters, a pair of beverage containers that are selectively accommodated in the internal spaces of the pair of fermenters, a temperature regulator configured to independently regulate internal temperatures of the pair of fermenters, ingredient feeders in which ingredient containers configured to contain beverages are selectively mounted and which are disposed outside the pair of fermenters, respectively, a main channel via each of the ingredient feeders, a pair of branch channels branched from the main channel and respectively connected to the pair of beverage containers, and a beverage dispenser connected to the pair of branch channels.

17 Claims, 16 Drawing Sheets

(58) Field of Classification Search
CPC .. B67D 1/1222; B67D 1/1243; B67D 1/1245; B67D 1/1247; B67D 1/1277; B67D 1/1466; B67D 1/16; B67D 2001/0089; B67D 2001/0493; B67D 2001/1483; B67D 2210/00026; B67D 2210/00031; B67D 2210/0006; B67D 2210/00118; B67D 2210/00125; C12C 13/10; C12C 11/006; C12C 11/00; C12C 13/08; C12C 13/02; C12C 11/003; C12C 11/02; C12C 13/00; C12C 7/06; C12C 7/205; C12C 12/00; C12C 3/00; C12C 3/04; C12C 5/00; C12C 5/02; C12C 5/026; C12C 7/00; C12C 7/04
USPC .................................. 99/276, 278, 281, 470
See application file for complete search history.

(56) References Cited

U.S. PATENT DOCUMENTS

| | | | |
|---|---|---|---|
| 2017/0332829 A1* | 11/2017 | Kim | C12C 13/00 |
| 2017/0335256 A1* | 11/2017 | Park | C12C 11/006 |
| 2018/0016530 A1* | 1/2018 | Park | C12C 13/10 |
| 2018/0016531 A1* | 1/2018 | Park | C12C 13/10 |
| 2018/0371385 A1* | 12/2018 | Hong | B67D 1/0016 |
| 2019/0024028 A1* | 1/2019 | Hong | C12C 11/006 |
| 2019/0144804 A1* | 5/2019 | Hong | C12C 13/10 99/276 |
| 2019/0153366 A1* | 5/2019 | Park | C12C 13/10 |
| 2019/0153367 A1* | 5/2019 | Min | B08B 9/0325 |
| 2019/0153368 A1* | 5/2019 | Yoon | C12C 13/10 |
| 2019/0153369 A1* | 5/2019 | Heo | C12C 11/00 |
| 2019/0153370 A1* | 5/2019 | Hong | C12C 13/10 |

\* cited by examiner

BEVERAGE MAKER

CROSS-REFERENCE TO RELATED APPLICATIONS

The present application claims priority under 35 U.S.C. 119 and 35 U.S.C. 365 to Korean Patent Application No. 10-2020-0072110, filed on Jun. 15, 2020, which is hereby incorporated by reference in its entirety.

BACKGROUND

The present disclosure relates to a beverage maker and, more particularly, to a beverage maker for making fermented beverages.

Beverages are collectively referred to as drinkable liquids such as alcohol or tea. For example, beverages may be divided into various categories such as water (a beverage) to solve thirst, juice beverages with unique flavor and taste, refreshing beverages giving refreshing sensation, or alcoholic beverages with an alcohol effect.

A representative example of an alcoholic beverage may be a beer. The beer is an alcoholic beverage made by making juice of malt sprouting from barley, filtering the juice, adding hop, and fermenting the juice by using the yeast.

Consumers may purchase ready-made products made and sold by a beer maker or home beer (or handmade beer) made by directly fermenting beer ingredients at home or in a bar.

House beer may be made in a variety of types, and may be made according to the consumer's taste.

The ingredients for making beer may include water, malt, hop, yeast, flavoring additives, and the like.

The yeast, which is sometimes called leaven, may be added to malt, ferment the malt, and help to produce alcohol and carbonic acid.

The flavor additives may enhance the taste of beer with flavors such as fruit and the like.

The house beer may be made through three stages, which includes, for example, a wort production stage, a fermentation stage, and an aging stage. In some cases, it may take about two to three weeks from the wort production step to the aging stage.

In some cases, an optimum temperature may be maintained during the fermentation stage. The user's convenience may be improved if more the beer is produced in a simple way.

It is of interest to develop a beverage maker that can produce fermented beverages such as beer in a safe and simple way.

An automated beverage maker according to the related art is disclosed in US 2014/0017354 A1 (BEER BREWING SYSTEM AND METHOD) or US 2010/0129490 A1 (COMBINED BREWING SYSTEM) and has a limitation of being too large to be mainly used at home and difficult to be installed at home.

In addition, there is a limitation in that the automated beverage maker includes only a single fermenter, and thus, it is difficult to make a new beverage until a beverage contained in the fermenter is completely exhausted and to make two or more types of beverages at the same time.

SUMMARY

Embodiments provide a beverage maker that is capable of fermenting different types of beverages at the same time.

Embodiments also provide a beverage maker that is capable of making one beverage during fermentation or storage of the other beverage.

Embodiments also provide a beverage maker that is capable of selectively dispensing different types of beverage from a single beverage dispenser.

Embodiments also provide a beverage maker including a pair of fermenters that are independently regulated in temperature and a pair of beverage containers that are selectively accommodated in the pair of fermenters. Embodiments also provide a beverage maker that is configured to selectively provide an ingredient into a pair of beverage containers and selectively dispense a beverage from the pair of beverage containers.

Hereinafter, this will be described in more detail.

In one embodiment, a beverage maker includes: a pair of fermenters, each of which has an internal space; a pair of fermenter lids configured to shield the internal spaces of the pair of fermenters; a pair of beverage containers that are selectively accommodated in the internal spaces of the pair of fermenters; a temperature regulator configured to independently regulate internal temperatures of the pair of fermenters; an ingredient feeder in which ingredient containers configured to contain beverages are selectively mounted and which is disposed outside the pair of fermenters; a main channel via the ingredient feeder; a pair of branch channels branched from the main channel and respectively connected to the pair of beverage containers; and a beverage dispenser connected to the pair of branch channels.

The ingredient feeder may be disposed between the pair of fermenters.

The beverage maker may further include: an air pump; an air supply channel connected to the air pump; and a pair of air branch channels branched from the air supply channel and respectively connected to the pair of fermenters. Each of the beverage containers may be made of a flexible ingredient, and each of the air branch channels may be configured to guide air between an inner wall of each of the fermenters and an outer surface of the beverage container.

The beverage maker may further include a pair of exhaust channels branched from the pair of air branch channels and configured to exhaust the air between the inner wall of the fermenter and the outer surface of the beverage container.

The beverage maker may further include a pair of gas exhausters configured to exhaust gases within the pair of beverage containers.

The beverage maker may further include: a water tank disposed behind the pair of fermenters; a water supply pump configured to supply water stored in the water tank to the main channel; and a water supply heater configured to heat the water supplied by the water supply pump.

At least one of the water supply pump or the water supply heater may be disposed between the pair of fermenters and disposed under the ingredient feeder.

The beverage maker may further include a back cover which is disposed behind the pair of fermenters and on which the water tank is detachably mounted.

The back cover may include: an upper cover portion disposed in front of the water tank; and a lower cover portion disposed to be stepped backward with respect to the upper cover portion and configured to support the water tank at a lower side.

The temperature regulator may include: a compressor; a condenser configured to condense a refrigerant compressed in the compressor; and a pair of evaporation tubes which are wound around outer circumferences of the pair of fermenters, respectively, and through which the refrigerant condensed in the condenser flows to be divided.

The beverage maker may further include a back cover configured to define a machine room in which the compressor and the condenser are disposed.

The beverage maker may further include an air pump configured to inject air into the main channel, disposed under the ingredient feeder, and disposed between the pair of fermenters.

The beverage maker may further include a center cover configured to cover a space between the pair of fermenters at a front side.

The beverage dispenser may include: a dispenser mounted on the center cover; and a dispensing channel configured to connect the pair of branch channels to the dispenser.

The beverage maker may further include a cleaning channel configured to guide water or air to the beverage dispenser by bypassing the main channel and the pair of branch channels.

The beverage maker may further include a controller configured to clean the beverage dispenser through the cleaning channel before the beverage contained in another beverage container is dispensed to the beverage dispenser when the beverage contained in one beverage container is dispensed to the beverage dispenser.

Each of the branch channels may be configured to: guide a fluid within the main channel to the beverage container, and guide a beverage within the beverage container to the beverage dispenser after the beverage is completely made.

The beverage maker may further include: a pair of main valves configured to open and close the pair of branch channels, respectively; and a controller configured to control the pair of main valves so that a fluid within the main channel selectively flows to the pair of branch channels.

In another embodiment, a beverage maker includes: a base; a first beverage fermenter and a second beverage fermenter, which are disposed to be spaced apart from each other above the base and are capable of being independently regulated in temperature; a first beverage container selectively accommodated in the first fermenter; a second beverage container selectively accommodated in the second fermenter; an ingredient feeder in which ingredient containers configured to contain beverages are selectively mounted and which is disposed outside the first fermenter and the second fermenter; a main channel configured to guide water or air via the ingredient feeder; a first branch channel branched from the main channel and connected to the first beverage container; a second branch channel branched from the main channel and connected to the second beverage container; and a beverage dispenser connected to the first branch channel and the second branch channel.

The first fermenter and the second fermenter may be disposed symmetrically with respect to the ingredient feeder.

According to the embodiment, since the pair of fermentation modules may regulate the temperature independently from each other, and the ingredients are selectively put into the pair of fermentation modules, the different types of beverages may be fermented in the pair of fermentation modules at the same time. Therefore, since the user makes and tastes the different types of beverages at the same time, there may be the advantage in that the usability of the beverage maker increases.

In addition, since the ingredients are selectively put into the pair of fermentation modules, while the beverage is fermented or stored in one fermentation module, the beverage may be made in the other fermentation module. As a result, since another beverage is made in the other fermentation module in advance before the beverage of one fermentation module is exhausted, the user may alternately make the beverage by alternately using the pair of fermentation modules to minimize the waiting time until the beverage is consumed.

In addition, in the state in which the different types of beverages are stored in the pair of fermentation modules, the different types of beverages may be selectively dispensed by the single beverage dispenser. Therefore, since the plurality of beverage dispensers are not required, the structure of the beverage maker may be simplified and compact.

In addition, the beverage dispenser may be cleaned before the previously dispensed beverage and the different type of beverage are dispensed to the beverage dispenser. Therefore, the different types of beverages may be prevented from being mixed with each other to prevent the taste of the beverage from being violated.

The details of one or more embodiments are set forth in the accompanying drawings and the description below. Other features will be apparent from the description and drawings, and from the claims.

DETAILED DESCRIPTION OF THE EMBODIMENTS

Hereinafter, detailed embodiments of the present disclosure will be described in detail with reference to the accompanying drawings.

Although beer is exemplified as a beverage made by using a beverage maker in this specification, a kind of beverages is not limited to the beer that is capable of being made by using the beverage maker. For example, various kinds of beverages may be made through the beverage maker according to embodiments.

Figure 1:
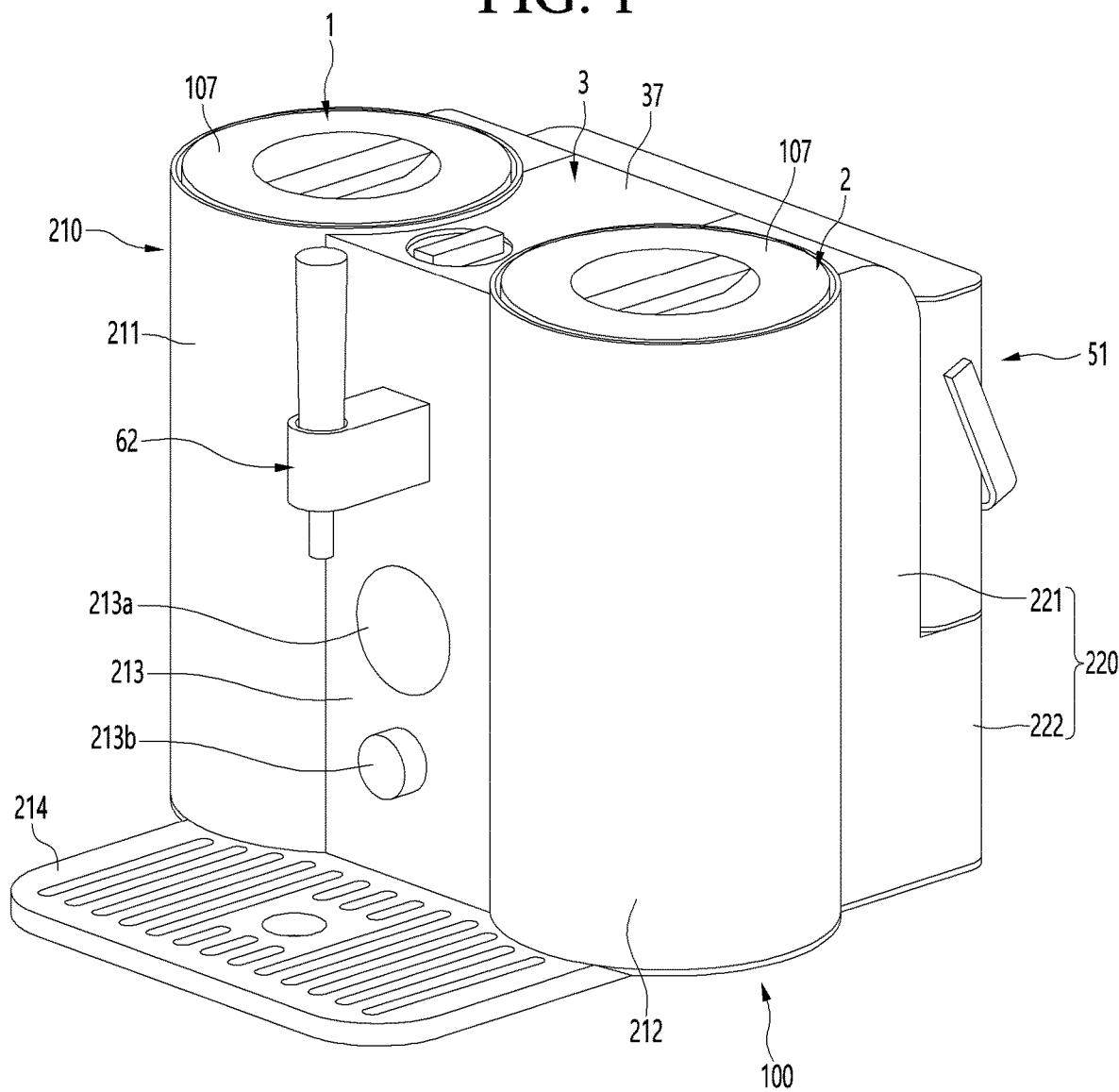
FIGS. 1 and 2 are views illustrating an outer appearance of a beverage maker according to an embodiment.
Figure 2:
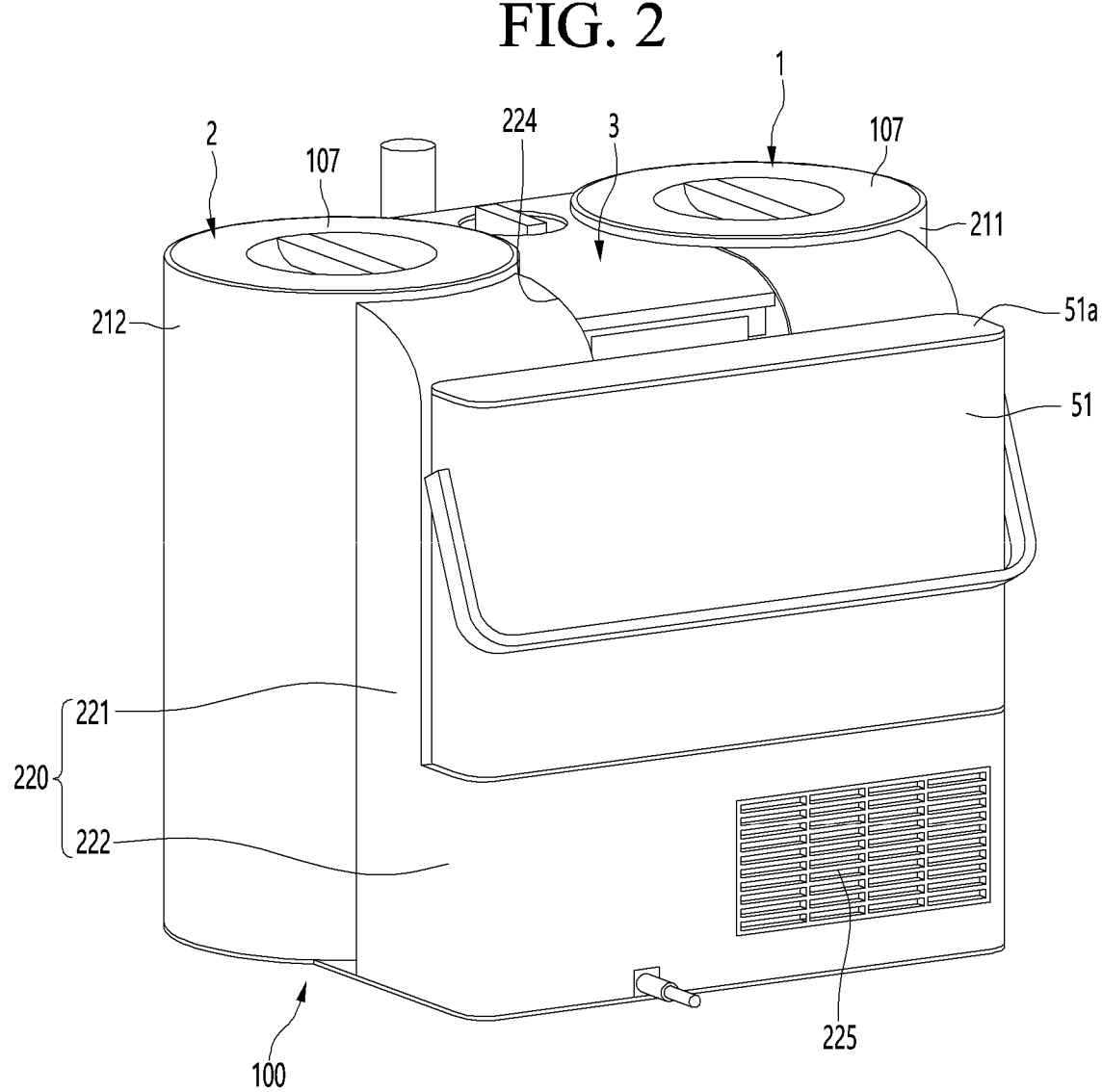

FIGS. 1 and 2 are views illustrating an outer appearance of a beverage maker according to an embodiment.

A beverage maker according to an embodiment may be a household beverage maker, but is not limited thereto.

The beverage maker includes a base 100, a pair of fermentation modules 1 and 2, which are disposed above the base 100 and in which beverages are fermented and an ingredient feeder 3 that supplies ingredients to the pair of fermentation modules 1 and 2.

The base 100 may define a bottom surface of the beverage maker. The base 100 may support the pair of fermentation modules 1 and 2 at a lower side.

The pair of fermentation modules 1 and 2 may be spaced apart from each other and may be disposed at both sides of the base 100. That is, the pair of fermentation modules 1 and 2 may include a first fermentation module 1 disposed at one side of the base 100 and a second fermentation module 2 disposed at the other side of the base 100. Each of the fermentation modules 1 and 2 may have a cylindrical shape, but is not limited thereto.

The ingredient feeder 3 may be disposed between the first fermentation module 1 and the second fermentation module 2 in a horizontal direction. The first fermentation module 1 and the second fermentation module 2 may be disposed symmetrically with respect to the ingredient feeder 3. In addition, the ingredient feeder 3 may be spaced upward from the base 100.

Each of the fermentation modules 1 and 2 may include a fermenter lid 107 that is opened and closed upward. In addition, the ingredient feeder 3 may include a feeder lid 37 that is opened and closed upward.

Each of the fermenter lid 107 and the feeder lid 37 may define a top surface of the beverage maker. Heights from the bottom surface to top surfaces of the fermenter lid 107 and the feeder lid 37 may be the same. Thus, the user may easily open and close each of the fermenter lid 107 and the feeder lid 37, and a design of the outer appearance of the beverage maker may be improved.

The beverage maker may include a front cover 210 and a back cover 220, which define the outer appearance thereof. The front cover 210 and the back cover 220 may be disposed above the base 100. A lower end of each of the front cover 210 and the back cover 220 may be in contact with an edge of the base 100.

The front cover 210 may cover the pair of fermentation modules 1 and 2 at a front side. In more detail, the front cover 210 may include a first fermentation module cover 211, a second fermentation module cover 212, and a center cover 213.

The first fermentation module cover 211 and the second fermentation module cover 212 may be spaced apart from each other. The first fermentation module cover 211 may cover a portion of an outer circumference of the first fermentation module 1, and the second fermentation module cover 212 may cover a portion of an outer circumference of the second fermentation module 2. Each of the fermentation module covers 211 and 212 may be rounded to correspond to the outer circumference of each of the fermentation modules 1 and 2.

The center cover 213 may cover a gap between the first fermentation module 1 and the second fermentation module 2. In more detail, the center cover 213 may cover a gap between the first fermentation module cover 211 and the second fermentation module cover 212.

The center cover 213 may cover the ingredient feeder 3 at a front side. A dispenser 62 from which the beverages are dispensed may be mounted on the center cover 213.

A display 213*a* that displays various pieces of information of the beverage maker may be disposed on the center cover 213. The display 282 may act as a touch screen to serve as an input unit.

The center cover 213 may include an input unit for receiving a command related to the making of the beverages using the beverage maker. The input unit 213*b* may include at least one of a rotary knob 213*b* that is held by the user to rotate and a button that is pressed by the user.

The back cover 220 may be disposed behind the pair of fermentation modules 1 and 2. The back cover 22 may define an internal space of the beverage maker together with the front cover 210.

A water tank 51 may be detachably mounted on the back cover 220. The water tank 51 may be mounted behind the back cover 220.

In more detail, the back cover 220 may include an upper cover portion 221 disposed in front of the water tank 51 and a lower cover portion 222 to be stepped backward from the upper cover portion 221. The lower cover portion 222 may support the water tank 51 at the lower side, and the water tank 51 may be detachably mounted on the lower cover portion 222.

The water tank 51 may have a box shape with an opened top surface. The water tank lid 51*a* may cover the open top surface of the water tank 51. In addition, the water tank 51 may be provided with a handle.

The back cover 220 may be provided with a recess 224 into which a rear end of the ingredient feeder 3 is fitted. In more detail, the recess 224 may be defined by recessing an upper center of the upper cover portion 221 downward. A portion of a front side of the ingredient feeder 3 may be disposed between the pair of fermentation modules 1 and 2, and a portion of a rear side of the ingredient feeder 3 may be fitted into the recess 224 of the back cover 220.

Also, a plurality of through-holes 225 may be defined in the back cover 220. The through-holes 225 may pass through a rear surface of the lower cover portion 222. Each of the through-holes may function as a discharge hole, through which a gas or air in the pair of fermentation modules 1 and 2 is discharged, or may function as a suction hole through which air is suctioned by a blower fan 135 (see FIG. 3) to be described later.

The beverage maker may include a drip tray 214 disposed under the dispenser 62. A plurality of holes may be defined in the top surface of the drip tray 214. The beverage dropping from the dispenser 62 may be stored in the drip tray 214 through the holes. Therefore, the periphery of the beverage maker may be maintained to be clean.

The drip tray 214 may be detachably connected to a front end of the base 100 and may be disposed in front of the base 100. The user may separate the drip tray 214 from the base 100 to empty and wash the inside of the drip tray 214.

Figure 3:
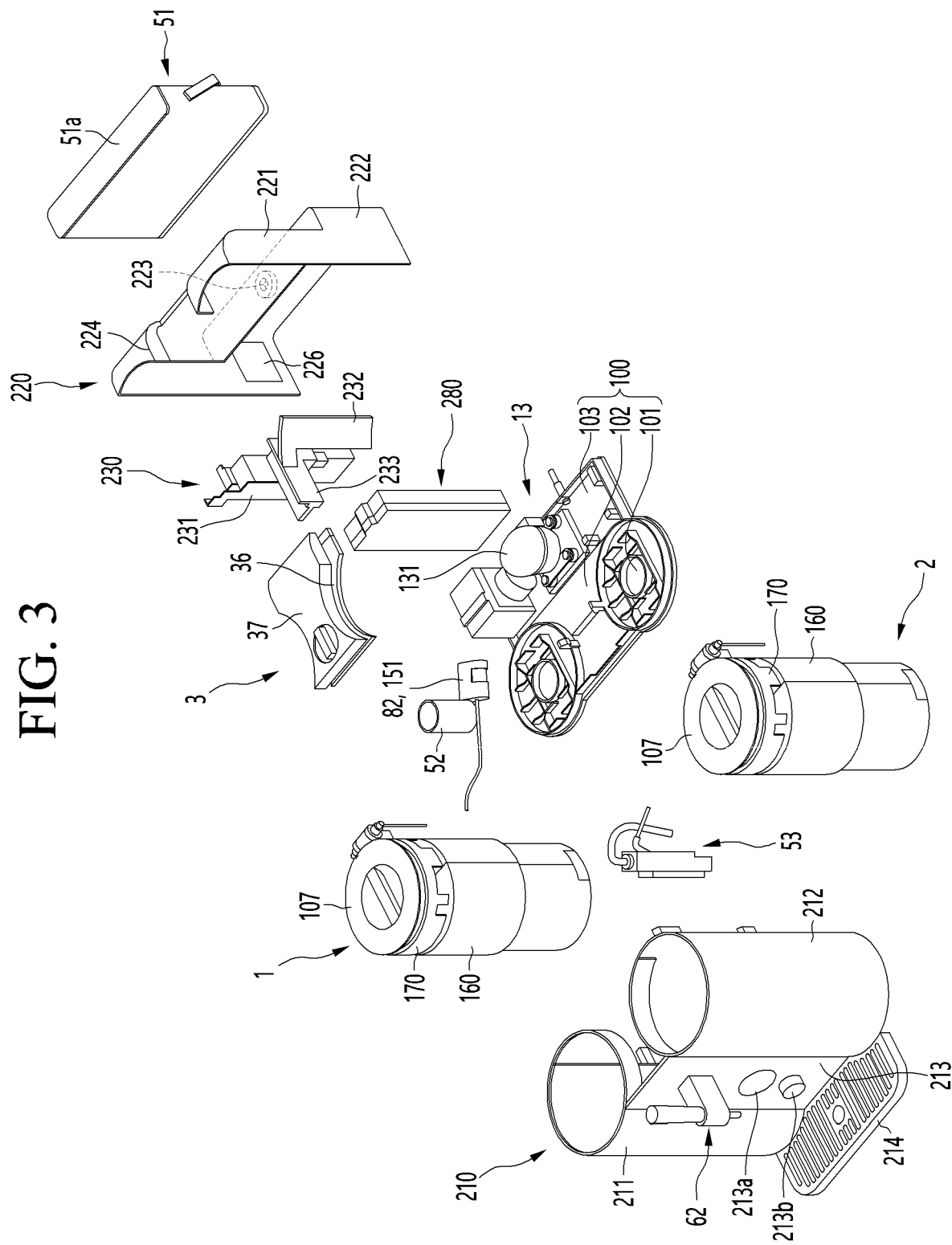
FIG. 3 is an exploded perspective view of the beverage maker according to an embodiment.
Figure 4:
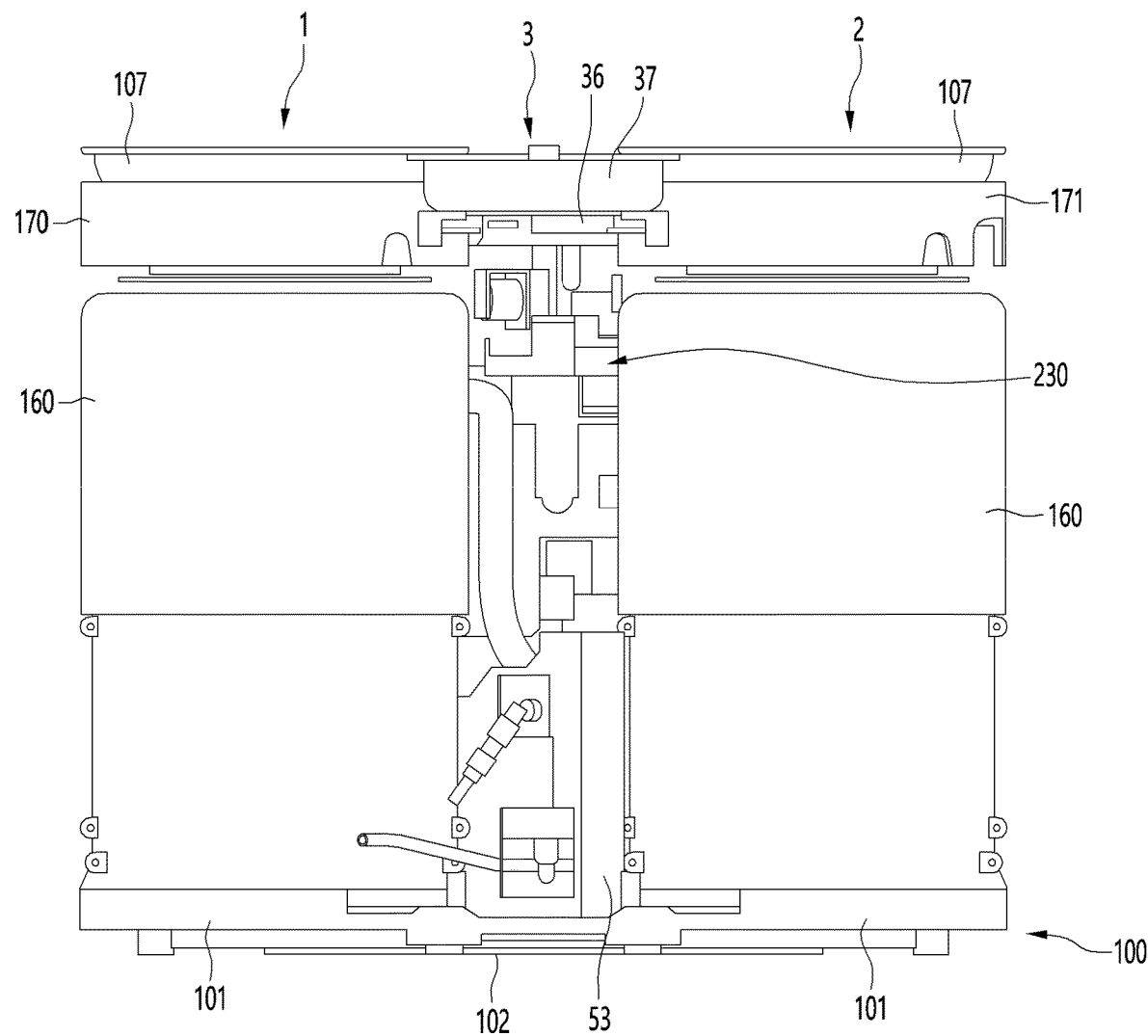
FIGS. 4 and 5 are front and rear views of the beverage maker from which the front cover and the back cover are removed.
Figure 5:
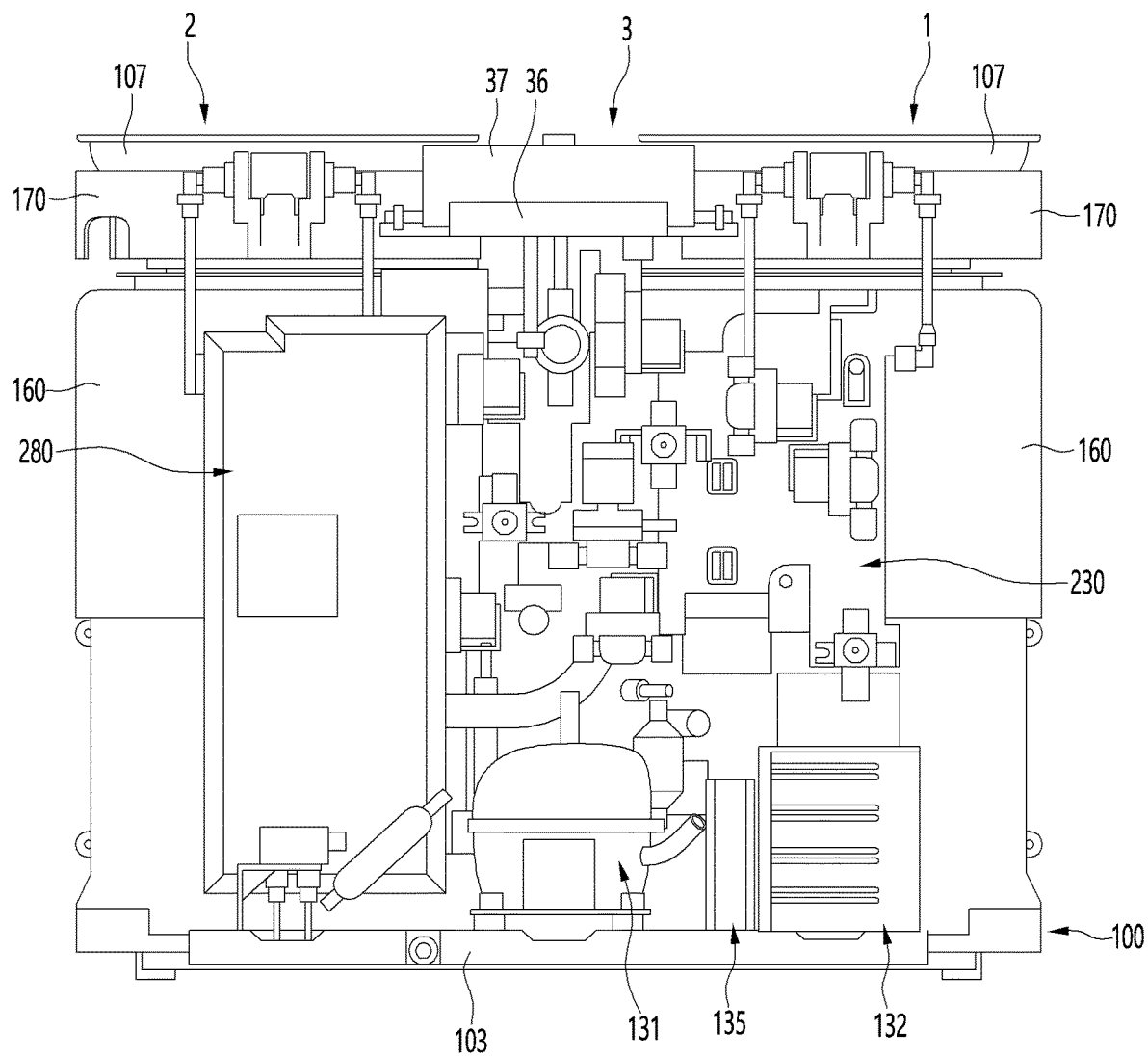
Figure 6:
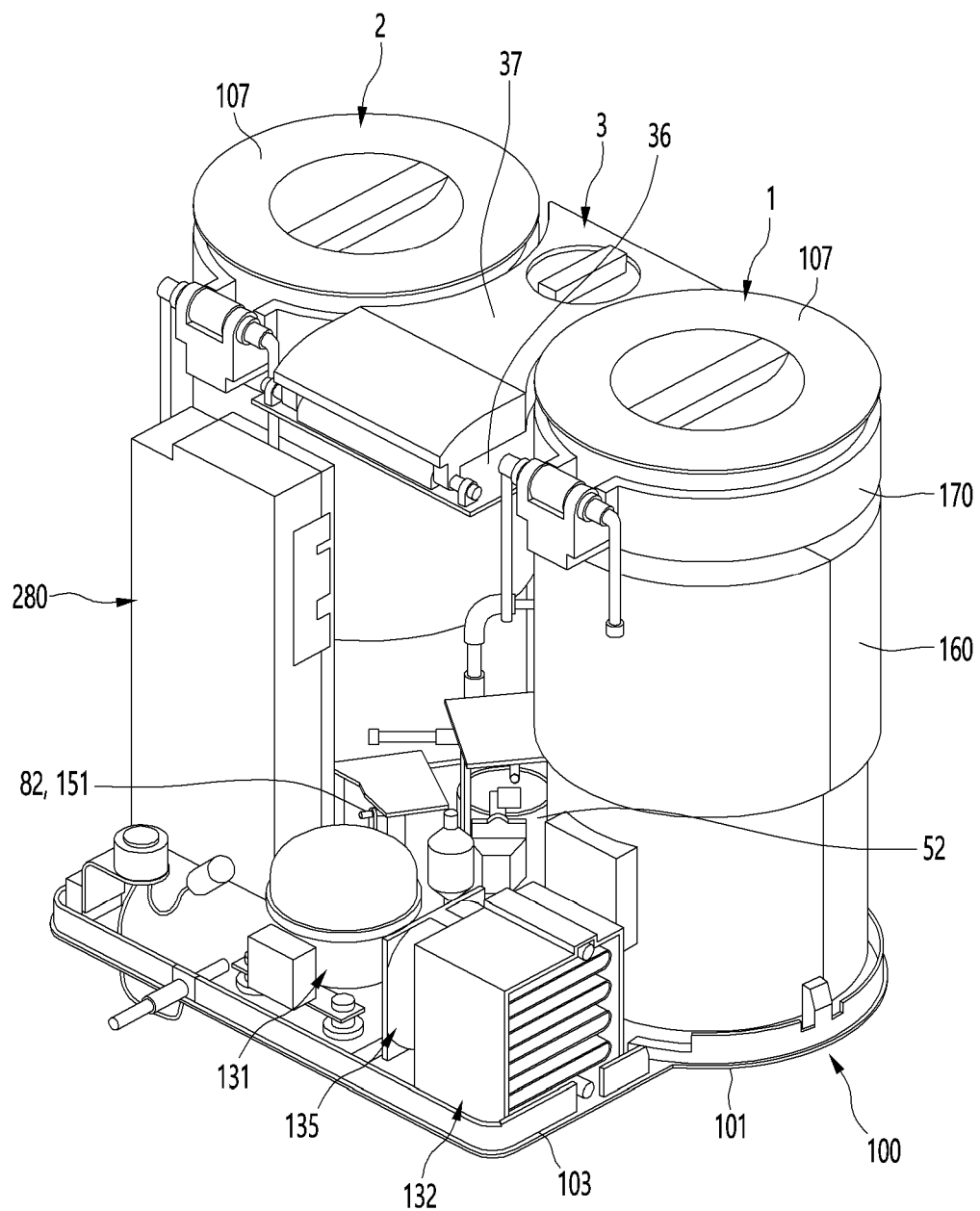
FIG. 6 is a view illustrating a state in which an inner body is further removed from the beverage maker illustrated in FIGS. 4 and 5.

FIG. 3 is an exploded perspective view of the beverage maker according to an embodiment, and FIG. 4 is a view for explaining the inside of the beverage maker according to an embodiment. In more detail, FIGS. 4 and 5 are front and rear views of the beverage maker from which the front cover and the back cover are removed. FIG. 6 is a view illustrating a state in which an inner body is further removed from the beverage maker illustrated in FIGS. 4 and 5.

The base 100 may include a pair of seats 101 on which the pair of fermentation modules 1 and 2 are seated, a connection portion 102 connecting the pair of seats 101 to each other, and an extension portion 103 extending backward from the connection portion 102.

Each of the seats 101 may have a disk shape corresponding to each of the fermentation modules 1 and 2. The pair of seats 101 may be spaced horizontally from each other, and the connection portion 102 may be disposed between the pair of seats 101.

The drip tray 214 may be connected to a front end of the connection portion 102. The front end of the connection portion 102 may be adjacent to a lower end of the center cover 213. A horizontal length of the front end of the connection portion 103 may be less than that of the rear end.

The ingredient feeder 3 may be spaced above the base 100, more specifically the connection portion 102.

A water supply heater 53 that heats water supplied from the water tank 51 to the fermentation modules 1 and 2 may be disposed above the connection portion 102.

In addition, a water supply pump 52 that supplies water to the fermentation modules 1 and 2 and air pumps 82 and 151 that injects air into the fermentation modules 1 and 2 may be disposed above the connection portion 102. The water supply pump 52 and the air pumps 82 and 151 may be disposed behind the water supply heater 53.

Thus, the water supply heater 53 and the air pumps 82 and 151 may be disposed between the connection portion 102 of the base 100 and the ingredient feeder 3 in the vertical direction and may be disposed between the pair of fermentation modules 1 and 2 in the horizontal direction.

The extension portion 103 may have a square plate shape. The extension portion 103 may be disposed behind the pair of seats 101 and the connection portion 102.

The back cover 220 may be disposed above the extension portion 103. The extension portion 103 may define a machine room together with the lower cover portion 222 of the back cover 220. A compressor 131, a condenser 132, and a blower fan 135 to be described later may be disposed in the machine room.

A connection hole 223 to which the water tank 51 is connected may be defined in the top surface of the lower cover portion 222.

In more detail, a valve (not shown) may be provided at a water outlet provided in the bottom surface of the water tank 51. A normally closed state of the water outlet of the water tank may be maintained by the valve. When the water outlet of the water tank 51 is connected to the connection hole 223, a protrusion (not shown) protruding upward from the connection hole 223 may press the valve upward to open the valve. Since this valve structure corresponds to a conventional technique, detailed descriptions thereof will be omitted.

Figure 7:
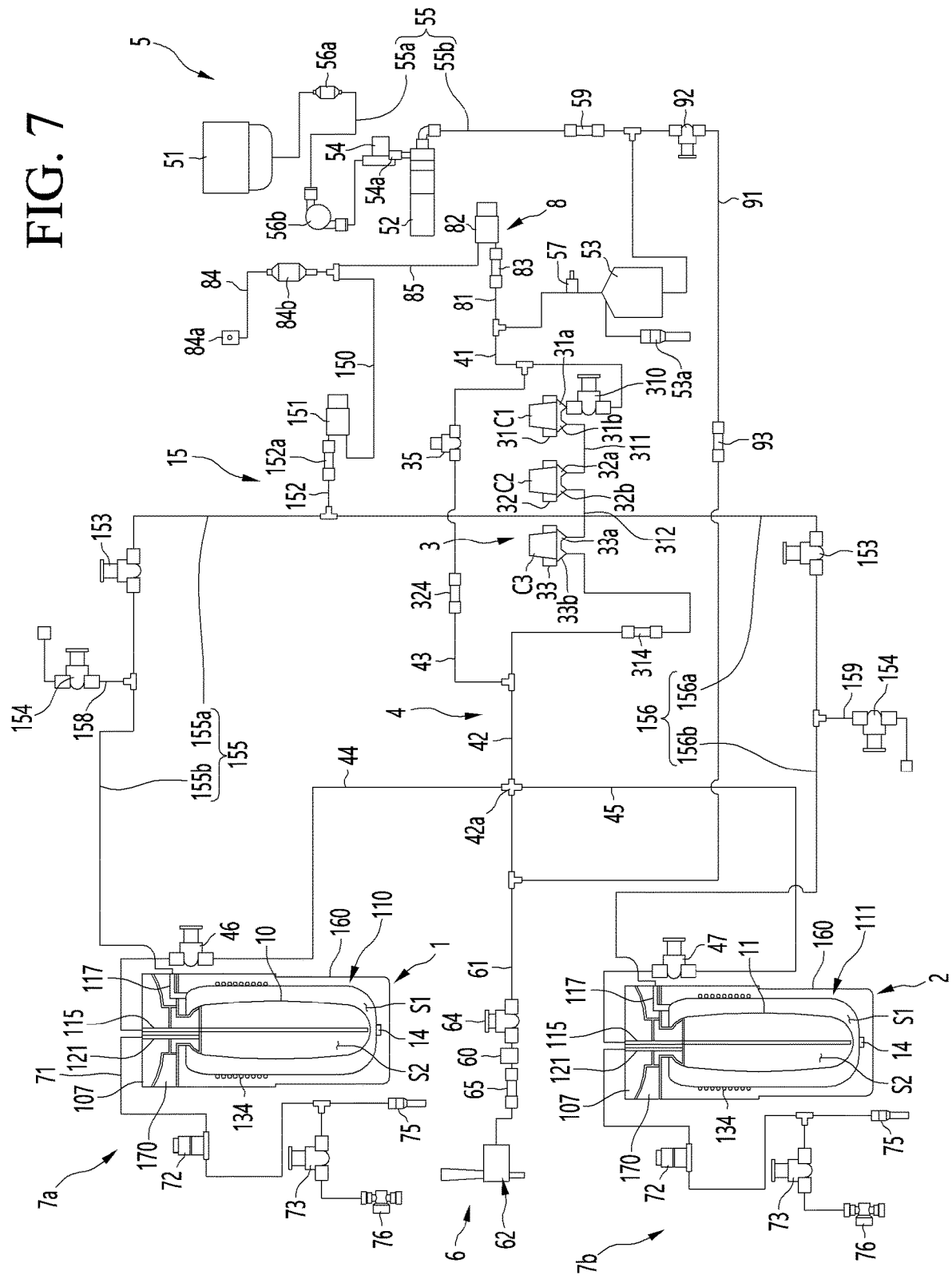
FIG. 7 is a view illustrating a configuration of a beverage maker according to an embodiment.

Therefore, when the water outlet of the water tank 51 is connected to the connection hole 223, the inside of the water tank 51 may communicate with the water tank water outlet channel 55a (see FIG. 7).

The beverage maker may include a temperature regulator 13 that independently regulates a temperature inside the pair of fermentation modules 1 and 2.

The configuration of the temperature regulator 13 is not limited thereto. For example, each of the fermentation modules 1 and 2 may be provided with a thermoelectric element. However, hereinafter, a case in which a cooling cycle device through which a refrigerant circulates is provided in the temperature regulator 13 will be described as an example.

In more detail, the temperature regulator 13 may include the compressor 131 that compresses the refrigerant, the condenser 132 that condenses the refrigerant compressed in the compressor 131, and a pair of evaporators 134 (see FIG. 7) disposed inside the pair of fermentation modules 1 and 2. The compressor 131, the condenser 132, and the pair of evaporators 134 may be connected to each other by a refrigerant pipe.

The compressor 131 and the condenser 132 may be disposed behind the fermentation modules 1 and 2. The compressor 131 and the condenser 132 may be disposed above the extension portion 103 of the base 100 and may be covered by the lower cover portion 222 of the back cover 220.

The pair of evaporators 134 (see FIG. 7) may evaporate the refrigerant and reduce the temperature inside the pair of fermentation modules 1 and 2. Each of the evaporators 134 may be an evaporation tube wound around the outer circumference of the fermenter 110 (see FIG. 7) provided in each of the fermentation modules 1 and 2.

The refrigerant condensed in the condenser 132 may be divided into the pair of evaporators 134 to flow. Thus, the pair of evaporators 134 may simultaneously cool the inside of each of the pair of fermentation modules 1 and 2. However, a valve (not shown) that controls a flow of the refrigerant may be provided in the refrigerant pipe connecting the condenser 132 to the pair of evaporators 134. Thus, the refrigerant condensed in the condenser 132 may flow to only one of the pair of evaporators 134 by controlling the valve.

The temperature regulator 13 may further include a blower fan 135 that dissipates the condenser 132. The blower fan 135 may be disposed between the compressor 131 and the condenser 132.

The back cover 220, in more detail, the through-hole 225 (see FIG. 2) defined in the rear surface of the lower cover portion 222 may serve as a suction hole through which air is suctioned into the blower fan 135.

In addition, a discharge hole 226 through which air is discharged and blown by the blower fan 135 to dissipate the condenser 132 may be defined in the back cover 220. In more detail, the discharge hole 226 may be defined at one side of the lower cover portion 222. The condenser 132 may be disposed between the blower fan 135 and the discharge hole 226.

The beverage maker may include an electronic box 280. The electronic box 280 may be referred to as a controller.

The electronic box 280 may include a case defining an outer appearance thereof and a plurality of electrical components disposed inside the case. Thus, the electronic components may be protected from external vibration or shocks. For example, the plurality of electronic components may include at least one processor that controls an overall operation of the beverage maker and a communication module that wirelessly communicates with an external terminal.

For example, the controller 280 may control opening and closing of a plurality of valves provided in the beverage maker. In addition, the controller 280 may regulate the internal temperature of each of the fermentation modules 1 and 2 by controlling the temperature regulator 13 and the heater 14. In addition, the controller 280 may control the water supply pump 52, the water supply heater 53, and the air pumps 82 and 151.

The electronic box 280 may be disposed to be long vertically. The electronic box 280 may be disposed behind the fermentation module 1 and 2 may be disposed above the extension portion 103 of the base 100 and also may be covered by the back cover 220.

In more detail, the electronic box 280 may be disposed behind one fermentation module 1, and a condenser 135 may be disposed behind the other fermentation module 2. The compressor 131 may be disposed between the electronic box 280 and the condenser 132 and may be disposed to face a gap between the pair of fermentation modules 1 and 2 with respect to the front side. That is, the compressor 131 may be disposed behind the water supply pump 52 and the air pumps 82 and 151.

The beverage maker may further include an inner body 230. The inner body 230 may be disposed between the pair of fermentation modules 1 and 2 and the back cover 220. The inner body 230 may function as a mounter on which a plurality of valves provided in the beverage maker are mounted.

In more detail, the inner body 230 may include a first body 231 adjacent to the outer circumference of the first fermentation module 1, a second body 231 adjacent to the outer circumference of the second fermentation module 2, and a third body 233 connecting the first body 231 to the second body 232 and protruding between the pair of fermentation modules 1 and 2.

The first body 231 may include a curved surface corresponding to the outer circumference of the first fermentation module 1, and the second body 232 may include a curved surface corresponding to the outer circumference of the second fermentation module 2. Thus, a gap between the inner body 230 and the pair of fermentation modules 1 and 2 may be minimized, and thus, the beverage maker may be compact.

In addition, the third body 233 may be disposed under the ingredient feeder 3. A portion of a front side of the third body 233 may be disposed above the water supply heater 53. That is, the third body 233 may block a gap between the ingredient feeder 3 and the water supply heater 53. Thus, the third body 233 may minimize heat from the water supply heater 53 to be transferred to the ingredient contained in the ingredient feeder 3.

The ingredient feeder 3 may include a feeder body 36 and a feeder lid 37 covering the feeder body 36 at an upper side.

An ingredient may be accommodated in the feeder body 36. In more detail, at least one ingredient container C1, C2, or C3 (see FIG. 7) containing the ingredient may be detachably mounted on the feeder body 36. For example, each of the ingredient containers C1, C2, and C3 may be a capsules or pod.

The feeder lid 37 may cover the ingredient containers C1, C2, and C3 mounted on the feeder body 36 at the upper side. The user may mount the ingredient containers C1, C2, and C3 on the feeder body 36 or separate from the feeder body 36 in a state in which the feeder lid 37 is opened.

The feeder lid 37 may be slidably disposed or rotatably connected to the feeder body 36. For example, the feeder lid 37 may be hingedly connected to the feeder body 36.

Each of the fermentation modules 1 and 2 may include a case 160 defining an outer appearance, a fermenter 110 (see FIG. 7) disposed in the case 160 (see FIG. 7), and the fermenter lid 107 that opens and closes the fermenter 110. Each of the fermentation modules 1 and 2 may further include a lid seating body 170 on which the fermenter lid 107 is seated.

The fermenter 110 may have an internal space S1 and an opening communicating with the internal space S1. The opening may be defined in an upper portion of the fermenter 110 and may be opened and closed by the fermenter lid 107. That is, the fermenter lid 107 may seal the internal space S1 of the fermenter 110.

As described above, the evaporation tube 134 may be wound around the outer circumference of the fermenter 110. The evaporation tube 134 may reduce a temperature of the fermenter 110. In addition, a heater 14 that allows the temperature of the fermenter 110 to increase may be provided on an outer surface of the fermenter 110. For example, the heater may be disposed on a bottom surface of the fermenter 110.

In addition, the fermenter 110 may be provided with a temperature sensor (not shown) that senses the temperature of the fermenter 110.

The fermenter 110 provided in the first fermentation module 1 may be referred to as a first fermenter, and the fermenter 110 provided in the second fermentation module 2 may be referred to as a second fermenter.

In addition, the beverage containers 10 and 11 (see FIG. 7) may be selectively accommodated in the internal space S1 of the fermenter 110. The beverage containers 10 and 11 will be described later in detail.

The outer circumference of the fermenter 110 may be spaced apart from the inner circumference of the case 160. In addition, a bottom surface of the fermenter 110 may be spaced upward with respect to an inner bottom surface of the case 160.

An insulation portion (not shown) may be provided between the outer surface of the fermenter 110 and the inner surface of the case 160. That is, the insulation part may be disposed inside the case 160 and may surround the fermenter 112, the evaporation tube 134, and the heater 14 together. For example, the insulation portion may be made of a material such as expanded polystyrene (EPS) or polyurethane, which has high thermal insulation performance and absorbs vibration. As a result, the fermenter 110 may be thermally insulated from the outside.

The lid seating body 170 may have an approximately annular shape. The lid seating body 170 may be disposed above the case 160. The opening of the fermenter 100 may communicate with the inside of the lid seating body 170. The fermenter lid 107 may be rotatably connected to the lid seating body 170, and the opening of the fermenter 110 may be opened and closed at the upper side. For example, the fermenter lid 107 may be hingedly connected to the lid seating body 170.

FIG. 7 is a view illustrating a configuration of the beverage maker according to an embodiment.

The pair of beverage containers 10 and 11 may be selectively accommodated in the fermenters 110 of the pair of fermentation modules 1 and 2. The pair of beverage containers 10 and 11 may include a first beverage container 10 selectively accommodated in the first fermentation module 1 and a second beverage container 11 selectively accommodated in the second fermentation module 2.

Each of the beverage containers 10 and 11 may be inserted into the internal space S1 of the fermenter 110 through the opening of the fermenter 110.

The fermentation ingredient may be put into the internal space S2 of the beverage containers 10 and 11 so as to be fermented. In addition, the made beverage may be stored in the internal space S2 of each of the beverage containers 10 and 11. Thus, the internal space S2 of each of the beverage containers 10 and 11 may be referred to as a fermentation space or a storage space. That is, the beverage containers 10 and 11 may prevent the fermentation ingredients or beverages from being in contact with an inner wall of the fermenter 110. After the use is completed, the beverage containers 10 and 11 may be withdrawn to the outside of the fermenter 110.

In addition, the outer surfaces of the beverage containers 10 and 11 may be spaced apart from the inner wall of the fermenter 110. Thus, cold shock that occurs when yeast put into the beverage containers 10 and 11 are adjacent to the inner wall of the fermenter 110 cooled by the evaporation tube 134, may be prevented.

The configuration of the beverage containers 10 and 11 is not limited thereto. For example, each of the beverage containers 10 and 11 may be any one of a bag, a pack, and a PET. However, hereinafter, a case in which each of the beverage containers 10 and 11 is the pack will be described as an example.

In more detail, each of the beverage containers 10 and may include a pack body seated and supported on the top surface of the fermenter 110 and a flexible pack connected to the pack body and accommodated in the internal space S2 of the fermenter 110. The flexible pack may be expanded and contracted according to a pressure.

The pack body may be seated around the opening of the fermenter 10 and may be provided with a plurality of channels communicating with the inside of the flexible pack. Thus, the water or ingredient may be supplied into the internal space S2 of each of the beverage containers 10 and 11, or the air may be injected into the internal space S2 of each of the beverage containers 10 and 11. Here, a gas within the internal space S2 may be exhausted.

At least one ingredient container C1, C2, or C3 containing the ingredient may be selectively mounted on the ingredient feeder 3. In more detail, the ingredient feeder 3 may include container mounting portions 31, 32, and 33 on which the ingredient containers C1, C2, and C3 are mounted, respectively. The container mounting portions 31, 32, and 33 may be provided on the feeder body 36 (see FIG. 3) described above.

The ingredients contained in the ingredient containers C1, C2, and C3 may be at least some of the ingredients required to make the beverages.

For example, the ingredient for making the beverage may be accommodated to be distributed in the ingredient feeder 3 and the beverage containers 10 and 11. A portion of the ingredients for making the beverages may be accommodated in the beverage containers 10 and 11, and the remaining ingredients may be accommodated in the ingredient feeder 3. The remaining ingredient contained in the ingredient feeder 3 may be extracted by water supplied from the water supply module 5 to be described later and supplied to the beverage containers 10 and 11 and then may be mixed with some of the ingredients accommodated in the beverage containers 10 and 11.

The beverage containers 10 and 11 may contain main ingredients that are essential for making the beverages, and the ingredient feeder 3 may contain an additive added to each of the main ingredients.

For example, the ingredient for making beer may include water, malt, yeast, hops, edible oil, aroma, and the like. In this case, the main ingredient contained in the fermentation container 12 may be malt, and the additive contained in the ingredient feeder 3 may be yeast, hop, or oil.

When the plurality of ingredient containers C1, C2, C3 and the plurality of container mounting portions 31, 32, and 33 are provided, different ingredients may be contained in the plurality of ingredient containers C1, C2, and C3.

For example, the plurality of ingredient containers C1, C2, and C3 may include a first container C1 containing yeast, a second container C2 containing hops, and a third container C3 containing oil.

The types of beverages to be made may vary according to combination of the plurality of ingredient containers C1, C2, and C3.

For example, when a beverage is made while a first ingredient container set is mounted on the ingredient feeder 3, a first type beverage (e.g., ale) may be made. Different ingredients required for making the first type beverage may be divided and contained in the plurality of ingredient containers C1, C2, and C3 provided in the first ingredient container set.

On the other hand, when a beverage is made while a second ingredient container set is mounted on the ingredient feeder 3, a second type beverage (e.g., lager) may be made. Different ingredients required for making the second type beverage may be divided and contained in the plurality of ingredient containers C1, C2, and C3 provided in the second ingredient container set.

The plurality of container mounting portions 31, 32, and 33 may include a first mounting portion 31 on which the first container C1 is mounted, a second mounting portion 32 on which the second container C2 is mounted, and a third mounting portion 33 on which the third container C3 is mounted.

In addition, the plurality of container mounting portions 31, 32, and 33 may be partitioned from each other. Each of the container mounting portions 31, 32, and 33 may be provided with inlets 31A, 32A, and 33A through which a fluid is introduced and outlets 31B, 32B, and 33B through which the fluid is discharged. The inlets 31A, 32A, and 33A and the outlets 31B, 32B, and 33B may communicate with the insides of the ingredient container C1, C2, and C3 mounted on the container mounting portion 31, 32, and 33. Thus, the fluid introduced into the inlets 31A, 32A, and 33A may be mixed with the ingredients contained in the ingredient containers C1, C2, and C3 and then be discharged to the outlets 31B, 32B, and 33B. For example, the fluid introduced into the inlet 31a of the first mounting portion may be mixed with the ingredient contained in the first container C1 and then be discharged to the outlet 31b of the first mounting portion 31.

The plurality of ingredient containers C1, C2, and C3 may be connected in series with respect to the flow direction of water. In more detail, the ingredient feeder 3 may include at least one connection channel 311 or 312 connecting one outlet to the other inlet of the plurality of container mounting portions 31, 32, and 33.

For example, the outlet 31b of the first mounting portion 31 and the inlet 32a of the second mounting portion 32 may be connected to each other through the first connection channel 311. The outlet 32b of the second mounting portion 32 and the inlet 33a of the third mounting portion 33 may be connected to each other through the second connection channel 312.

The beverage maker may include a main channel 4 via the ingredient feeder 3 and a pair of branch channels 44 and 45 branched from the main channel 4 and connected to the pair of beverage containers 10 and 11.

The main channel 4 may guide water supplied from the water supply module 5 to be described later to pass through the ingredient feeder 3. For example, the water passes through the ingredient feeder 3 to extract the ingredients contained in the ingredient containers C1, C2, and C3.

In addition, the main channel 4 may guide the air injected from an air injector 8 to be described later to pass through the ingredient feeder 3. For example, the air may remove residual water remaining inside the ingredient containers C1, C2, and C3 after the ingredient is extracted.

The main channel 4 may include a first main channel 41 disposed upstream of the ingredient feeder 3 and a second main channel 42 disposed downstream of the ingredient feeder 3 with respect to the flow direction of the fluid.

The first main channel 41 may be connected to the inlet 31a of the container mounting portion 31 disposed at the most upstream of the plurality of container mounting portions 31, 32, 33 provided in the ingredient feeder 3. The second main channel 42 may be connected to the outlet 33b of the container mounting portion 33 disposed at the most downstream of the plurality of container mounting portions 31, 32, and 33 provided in the ingredient feeder 3. For example, the inlet 31a of the first mounting portion 31 may be connected to the first main channel 41, and the outlet 33a of the third mounting portion 33 may be connected to the second main channel 42.

The main channel 4 may be provided with a supply valve 310 that interrupts the flow of the fluid introduced into the ingredient feeder 3. In more detail, the supply valve 310 may interrupt the flow of the fluid introduced into the inlet 31*a* of the ingredient container 31 disposed at the most upstream. The supply valve 310 may be provided in the first main channel 41 and may open and close the first main channel 41. The supply valve 310 may be mounted on the inner body 230 (see FIG. 3). The supply valve 310 may be a solenoid valve controlled by the controller 280 (see FIG. 3).

The main channel 4 may be provided with a check valve 314 that prevents the fluid from flowing back to the ingredient feeder 3. In more detail, the check valve 314 may prevent the fluid from flowing back to the outlet 33*b* of the ingredient container 33 disposed at the most downstream. The check valve 314 may be provided in the second main channel 42. The check valve 314 may be installed so that the fluid passing through the ingredient feeder 3 flows toward the beverage containers 10 and 11.

A pair of branch channels 44 and 45 may be branched at the second main channel 42. That is, the branch channel 42 may be branched downstream of the ingredient feeder 3. The pair of branch channels 44 and 45 may be branched downstream from the check valve 314 provided in the second main channel 42.

The pair of branch channels 44 and 45 may include a first branch channel 44 in communication with the first beverage container 10 and a second branch channel 45 in communication with the second beverage container 11.

The first branch channel 44 may communicate with the internal space S2 of the first beverage container 10 through the fermenter lid 107 of the first fermentation module 1. In more detail, the fermenter lid 107 of the first fermentation module 1 may be provided with a branch channel connection portion 115 that allows the first branch channel 44 to communicate with the inside of the first beverage container 10. In more detail, a tube that communicates with the branch channel connection portion 115 may be provided inside the first beverage container 10. The tube may extend to be adjacent to an inner bottom surface of the first beverage container 10.

The first branch channel 44 may guide the fluid flowing to the main channel 4 to the first beverage container 10 or guide the beverage contained in the first beverage container 10 to a beverage dispenser 6 to be described later. That is, the first branch channel 44 may be a bidirectional channel through which the fluid flows in both directions.

A first main valve 46 may be provided in the first branch channel 44. The first main valve 46 may open and close the first branch channel 44. The first main valve 46 may be mounted on the inner body 230 (see FIG. 3). The first main valve 46 may be a solenoid valve controlled by the controller 280 (see FIG. 3).

The second branch channel 45 may communicate with the internal space S2 of the second beverage container 11 through the fermenter lid 107 of the second fermentation module 2. In more detail, the fermenter lid 107 of the first fermentation module 2 may be provided with a branch channel connection portion 115 that allows the second branch channel 45 to communicate with the inside of the second beverage container 11. In more detail, a tube that communicates with the branch channel connection portion 115 may be provided inside the second beverage container 11. The tube may extend to be adjacent to the inner bottom surface of the second beverage container 11.

The second branch channel 45 may guide the fluid flowing to the main channel 4 to the second beverage container 11 or guide the beverage contained in the second beverage container 11 to the beverage dispenser 6 to be described later. That is, the second branch channel 45 may be a bidirectional channel through which fluid flows in both directions.

A second main valve 47 may be provided in the second branch channel 45. The second main valve 47 may open and close the second branch channel 45. The second main valve 47 may be mounted on the inner body 230 (see FIG. 3). The second main valve 47 may be a solenoid valve controlled by the controller 280 (see FIG. 3).

The first main valve 46 and the second main valve 47 may be closed at the same time or may be opened alternatively. In more detail, when the fluid in the main channel 4 has to flow to the first beverage container 10, the first main valve 46 may be opened, and the second main valve 47 may be closed. On the other hand, when the fluid in the main channel 4 has to flow to the second beverage container 11, the second main valve 47 may be opened, and the first main valve 46 may be closed.

The beverage maker may further include a bypass channel 43 connecting the first main channel 41 to the second main channel 42 by bypassing the ingredient feeder 3. The bypass channel 43 may guide the fluid of the first main channel 41 to the second main channel 42 by bypassing the ingredient feeder 3.

The water supplied from the water supply module 5 or the air injected from the air injector 8 may pass through the bypass channel 43 instead of the ingredient feeder 3 to pass to the first beverage container 10 or the second beverage container 11. Thus, the water or air may be supplied to the beverage containers 10 and 11 without extracting the ingredient contained in the ingredient feeder 3.

One end of the bypass channel 34 may be connected to an upstream side of the supply valve 310 with respect to the first main channel 41. The other end of the bypass channel 34 may be connected between the check valve 314 and the pair of branch channels 44 and 45 with respect to the second main channel 42.

A bypass valve 35 may be provided in the bypass channel 34. The bypass valve 35 may open and close the bypass channel 34. The bypass valve 35 may be mounted on the inner body 230 (see FIG. 3). The bypass valve 35 may be a solenoid valve controlled by the controller 280 (see FIG. 3).

The check valve 324 may be provided in the bypass channel 34. The check valve 324 may prevent the fluid from flowing back to the bypass valve 35. The check valve 324 may be installed so that the fluid flows from the first main channel 41 to the second main channel 42 through the bypass channel 43. The check valve 324 may be disposed downstream of the bypass valve 35 with respect to the flow flowing through the bypass channel 43.

However, that the beverage maker may not include the ingredient feeder 3 and the bypass channel 43. In this case, the main channel 4 may be provided as a single channel, and the main ingredient may be accommodated in the beverage containers 10 and 11. Thus, the user may directly inject the additive into the beverage containers 10 and 11.

On the other hand, the beverage maker may include a water supply module 5. The water supply module 5 may supply water to the beverage containers 10 and 11 through the main channel 4 and the branch channels 44 and 45.

The water supply module 5 may include a water tank 51 in which water is stored, a water supply pump 52 that pumps water from the water tank 51, a water supply heater 53 that heats the water pumped from the water supply pump 52, and a water supply channel 55 connected to the main channel 4.

The water supply channel 55 may connect the water tank 51 to the main channel 4 via the water supply pump 52 and the water supply heater 53. Thus, the water stored in the water tank 51 may be supplied to the main channel 4 through the water supply channel 55.

In more detail, the water supply channel 55 may be connected to the first main channel 41. The water supply channel 55 may be connected to an upstream side of the supply valve 310 and the bypass channel 43 with respect to the first main channel 41.

The water supply channel 55 may include a first water supply channel 55a disposed upstream of the water supply pump 52 and a second water supply channel 55b disposed downstream of the water supply pump 52. The second water supply channel 55b may be connected to the first main channel 41 via the water supply heater 53.

The water contained in the water tank 51 may be suctioned into the water supply pump 52 through the first water supply channel 55a. The water discharged from the water supply pump 52 may be guided to the first main channel 41 through the second water supply channel 55b.

A muffler 56a that reduces noise and a flow meter 56b that measures a flow rate of the water discharged from the water tank 51 may be installed in the first water supply channel 55a. In addition, a flow control valve 54 that adjusts the flow rate of the water discharged from the water tank 51 may be installed in the first water supply channel 55a. The muffler 56a, the flow meter 56b, and the flow control valve 54 may be sequentially disposed with respect to the flow direction of the water. However, this embodiment is not limited thereto.

In addition, a thermistor 54a that measures a temperature of the water discharged from the water tank 51 may be installed in the first water supply channel 55a. The thermistor 54a may be built in the flow rate control valve 54.

A check valve 59 that prevents the water from flowing back to the water supply pump 52 may be installed in the second water supply channel 55b. The check valve 59 may be disposed upstream of the water supply heater 53 with respect to the second water supply channel 55b.

The water in the second water supply channel 55b may pass through the water supply heater 53 and may be heated to be converted into hot water. For example, the water supply heater 53 may include a heater case, a flow path provided inside the heater case to constitute a portion of the second water supply channel 55b, and a heating coil disposed in the flow path.

A safety valve 53a that limits a maximum internal pressure (e.g., about 3.0 bar) of the water supply heater 53 may be connected to the water supply heater 53. The safety valve 53a may communicate with the inside of the water supply heater 53. In addition, the water supply heater 53 may be provided with a temperature sensor 57 that measures a temperature of hot water.

The beverage maker may include a beverage dispenser 6 connected to a pair of branch channels 44 and 45.

In more detail, the beverage dispenser 6 may include a dispenser 62 from which a beverage is dispensed, and a dispensing channel 61 connecting the dispenser 62 to the pair of branch channels 44 and 45.

The dispensing channel 61 may be connected to the main channel 4 as well as the pair of branch channels 44 and 45. For example, the dispensing channel 61, the first branch channel 44, and the second branch channel 45 may be branched from an end 42a of the second main channel 42.

The dispensing channel 61 may guide the beverage, which flows from the beverage container 10 and 11 to the branch channels 44 and 45, to the dispenser 62.

A dispensing valve 64 may be provided in the dispensing channel 61. The dispensing valve 64 may open and close the dispensing channel 61. The dispensing valve 64 may be mounted on the inner body 230 (see FIG. 3). The dispensing valve 64 may be a solenoid valve controlled by the controller 280 (see FIG. 3).

The dispenser 62 may be provided with a lever that is capable of being manipulated by the user, and the dispensing valve 64 may operate to be interlocked with the lever. For example, when the user pulls the lever of the dispenser 62, the dispensing valve 64 may open the dispensing channel 61, and when the user allows the lever of the dispenser 62 to return to its original position, the dispensing valve 64 may close the dispensing channel 61.

A decompression component 60 may be installed in the dispensing channel 61 to prevent a hydraulic pressure of the beverage from significantly increasing. The decompression component 60 may be disposed downstream of the dispensing valve 64. The pressure of the beverage passing through the decompression component 60 may gradually decrease. The beverage passing through the decompression component 60 may be dispensed from the dispenser 62 and may not generate excessive bubbles.

A check valve 65 may be provided in the dispensing channel 61 to prevent the beverage from flowing backward. The check valve 65 may be disposed downstream of the decompression component 60.

The beverage maker may include a pair of gas exhausters 7a and 7b through which a gas is exhausted from the pair of beverage containers 10 and 11.

The pair of gas exhausters 7a and 7b may include a first gas exhauster 7a connected to the first fermentation module and a second gas exhauster 7b connected to the second fermentation module 2.

The first gas exhauster 7a may exhaust a gas generated in the first beverage container 10. The second gas exhauster 7b may exhaust a gas generated in the second beverage container 11.

In more detail, each of the gas exhausters 7a and 7b may include a gas exhaust channel 71, a pressure sensor 72 and a gas exhaust valve 73, which are provided in the gas exhaust channel 71.

The gas generated in the beverage containers 10 and 11 may pass through the gas exhaust channel 71 and be exhausted to the outside due to a difference between an internal pressure of each of the beverage containers 10 and 11 and an atmospheric pressure.

The gas exhaust channel 71 may communicate with the internal space S2 of the beverage containers 10 and 11 through the fermenter lid 107 of each of the fermentation modules 1 and 2. In more detail, the fermenter lid 107 of each of the fermentation modules 1 and 2 may be provided with a gas exhaust channel connection portion 121 that allows the gas exhaust channel 71 to communicate with the inside of each of the beverage containers 10 and 11.

The pressure sensor 72 may sense a pressure in the gas exhaust channel 71, i.e., the internal pressure of each of the beverage containers 10 and 11.

The gas exhaust valve 73 may open and close the gas exhaust channel 71. The gas exhaust valve 73 may be disposed downstream of the pressure sensor 72 in the gas exhaust direction. The gas exhaust valve 73 may be mounted on the inner body 230 (see FIG. 3). The gas exhaust valve 73 may be a solenoid valve controlled by the controller 280 (see FIG. 3).

A safety valve 75 that limits a maximum internal pressure of each of the beverage containers 10 and 11 may be connected to the gas exhaust channel 71. The safety valve 75 may be connected between the pressure sensor 72 and the gas exhaust valve 73 with respect to the gas exhaust channel 71.

In addition, a noise reduction device 76 that reduces noise generated when the gas is discharged may be connected to the gas exhaust channel 71. The noise reduction device 76 may be disposed downstream of the gas exhaust valve 73. The noise reduction device 76 may include at least one of an orifice or a muffler.

The beverage maker may include an air injector 8.

The air injector 8 may inject air into the beverage containers 10 and 11. In more detail, the air injector 8 may inject air into the beverage containers 10 and 11 through the main channel 4 and the branch channels 44 and 45.

In more detail, the air injector 8 may include a first air pump 82 that pumps air and an air injection channel 81 that connects the first air pump 82 to the main channel 4.

The air injection channel 81 may be connected to the first main channel 41. The air injection channel 81 may be connected upstream of the supply valve 310 and the bypass channel 43 with respect to the first main channel 41. In addition, the air injection channel 81 may also communicate with the water supply channel 55. For example, the air injection channel 81 and the water supply channel 55 may be combined with each other and then connected to the first main channel 41.

The air injection channel 81 may be provided with a check valve 83 that prevents water in the main channel 4 from flowing back to the first air pump 82. The check valve 83 may be installed in a direction in which air flows from the first air pump 82 to the first main channel 41.

The beverage maker may include an air regulator 15.

The air regulator 15 may regulate a pressure between an inner wall of the fermenter 110 and an outer surface of the fermentation container 10. In more detail, the air regulator 15 may inject air into a space between the inner wall of the fermenter 110 and the outer surfaces of the beverage containers 10 and 11 or exhaust air from the space. That is, the air regulator 15 may regulate an internal pressure of the internal space S1 of the fermenter 110 provided in the fermentation modules 1 and 2.

In more detail, the air regulator 15 may include a second air pump 151, an air supply channel 152 connected to the second air pump 151, and a pair of air branch channels 155 and 156 branched from the air supply channel 151 and connected to the pair of fermentation modules 1 and 2. The air regulator 15 may further include a pair of exhaust channels 158 and 159 branched from the pair of air branch channels 155 and 156.

The second air pump 151 may supply air to the air supply channel 152. The air supply channel 152 may be provided with a check valve 152*a* that prevents air from flowing back to the second air pump 151.

The pair of air branch channels 155 and 156 may be connected to the fermenters 110 of the pair of fermentation modules 1 and 2.

In more detail, an air branch channel connection portion 117 that allows the air branch channels 155 and 156 to communicate with the internal space S1 of the fermenter 110 may be provided in the fermenter 110 of each of the fermentation modules 1 and 2. Thus, each of the air branch channels 155 and 156 may communicate with a space between the inner wall of the fermenter 110 and the outer surface of each of the beverage containers 10 and 11.

The pair of air branch channels 155 and 156 may include a first air branch channel 155 connected to the first fermentation module 1 and a second air branch channel 156 connected to the second fermentation module 2.

The first air branch channel 155 may guide the air supplied to the air supply channel 152 between the inner wall of the fermenter 110 of the first fermentation module 1 and the outer surface of the first beverage container 10.

The first air branch channel 155 may include a first channel 155*a* connecting the supply channel 152 to the first exhaust channel 158 and a second channel 155*b* connecting the first channel 155*a* to the first fermentation module 1.

The first channel 155*a* of the first air branch channel 155 may guide air from the supply channel 152 to the second channel 155*b*. The second channel 155*b* of the first air branch channel 155 may guide air from the first channel 155*a* to the internal space S1 of the fermenter 10 or from the internal space S1 of the fermenter 110 to the first exhaust channel 158. That is, the first channel 155*a* may be a one-way channel through which air flows in only one direction, and the second channel 155*b* may be a bidirectional channel through which air flows in both directions.

The second air branch channel 156 may guide air supplied to the air supply channel 152 between the inner wall of the fermenter 110 of the second fermentation module 2 and the outer surface of the second beverage container 11.

The second air branch channel 156 may include a first channel 156*a* connecting the supply channel 152 to the second exhaust channel 159, and a second channel 156*b* connecting the first channel 156*a* to the second fermentation module 2.

The first channel 156*a* of the second air branch channel 156 may guide air from the supply channel 152 to the second channel 156*b*. The second channel 156*b* of the second air branch channel 156 may guide air from the first channel 156*a* to the internal space S1 of the fermenter 10 or from the internal space S1 of the fermenter 110 to the second exhaust channel 159. That is, the first channel 156*a* may be a one-way channel through which air flows in only one direction, and the second channel 156*b* may be a bidirectional channel through which air flows in both directions.

Each of the air branch channels 155 and 156 may be provided with an air supply valve 153. The air supply valve 153 may open and close the air branch channels 155 and 156. The air supply valve 153 may be mounted on the inner body 230 (see FIG. 3). The air supply valve 153 may be a solenoid valve controlled by the controller 280 (see FIG. 3).

The supply valve 153 may be disposed upstream of the exhaust channels 158 and 159 with respect to the air branch channels 155 and 156. That is, the air supply valve 153 may be provided in each of the first channels 155*a* and 156*a* of the air branch channels 155 and 156.

The exhaust channels 158 and 159 may communicate with the internal space S1 of the fermenter 110 through the second channels 155*b* and 156*b* of the air branch channels 155 and 156.

In more detail, the pair of exhaust channels 158 and 159 may include a first exhaust channel 158 branched from the first air branch channel 155 and a second exhaust channel 159 branched from the second air branch channel 156.

The first exhaust channel 158 may communicate with a space between the inner wall of the fermenter 110 of the first fermentation module 1 and the outer surface of the first beverage container 10. The second exhaust channel 159 may communicate with a space between the inner wall of the fermenter 110 of the second fermentation module 2 and the outer surface of the second beverage container 11.

Each of the exhaust channels 158 and 159 may be provided with an exhaust valve 154. The exhaust valve 154 may open and close each of the exhaust channels 158 and 159. The exhaust valve 154 may be mounted on the inner body 230 (see FIG. 3). The exhaust valve 154 may be a solenoid valve controlled by the controller 280 (see FIG. 3).

When the exhaust valve 154 is opened in a state in which the internal pressure of the fermenter 110 is higher than atmospheric pressure, the air between the inner wall of the fermenter 110 and the outer surfaces of the beverage containers 10 and 11 may be exhausted to the exhaust channels 158 and 159 due to a pressure difference. Thus, the internal pressure of the fermenter 110 may be reduced.

The beverage maker may include a suction channel 84 through which air is suctioned and a pair of connection channels 85 and 150 branched from the suction channel 84 and connected to a pair of air pumps 82 and 151.

External air may be suctioned through the suction channel 84. An air filter 84*a* may be provided in the suction channel 84. The air filter 84*a* may filter foreign substances from air suctioned through the suction channel 84. In addition, a muffler 84*b* that reduces noise generated when air is suctioned may be installed in the suction channel 84. The muffler 84*b* may be disposed downstream of the air filter 84*a*.

A pair of connection channels 85 and 150 may be branched downstream of the air filter 84*a* and muffler 84*b* with respect to the intake channel 84.

The pair of connection channels 85 and 150 may include a first connection channel 85 connected to the first air pump 82 and a second connection channel 150 connected to the second air pump 151. The first connection channel 85 may guide air from the suction channel 84 to the first air pump 82. The second connection channel 150 may guide air from the suction channel 84 to the second air pump 151.

However, the beverage maker may not include the suction channel 84, and thus, the external air may be directly suctioned through the first connection channel 85 and the second connection channel 150. In this case, the first connection channel 85 and the second connection channel 150 may be separated from each other. An air filter and a muffler may be provided in the first connection channel 85 and the second connection channel 150, respectively.

The beverage maker may include a cleaning channel 91. The cleaning channel 91 may guide water or air to the beverage dispenser 6 by bypassing the main channel 4 and the pair of branch channels 44 and 45.

The cleaning channel 91 may connect the water supply channel 55 to the extraction channel 61 by bypassing the main channel 4 and the pair of branch channels 44 and 45.

One end of the cleaning channel 91 may be connected to the second water supply channel 55*b*. In more detail, one end of the cleaning channel 91 may be connected between the water supply pump 52 and the water supply heater 53 with respect to the water supply channel 55. In more detail, one end of the cleaning channel 91 may be connected between the check valve 59 and the water supply heater 53 with respect to the water supply channel 55.

The other end of the cleaning channel 91 may be connected upstream of the dispensing valve 64 with respect to the dispensing channel 61. That is, the other end of the cleaning channel 91 may be connected between the pair of branch channels 44 and 45 and the dispensing valve 64 with respect to the dispensing channel 61.

A cleaning valve 92 may be provided in the cleaning channel 91. The cleaning valve 92 may open and close the cleaning channel 91. The cleaning valve 92 may be mounted on the inner body 230 (see FIG. 3). The cleaning valve 92 may be a solenoid valve controlled by the controller 280 (see FIG. 3).

The cleaning channel 91 may be provided with a check valve 93 that prevents water, air, or beverages from flowing backward. The check valve 93 may be disposed downstream of the cleaning valve 92 with respect to the cleaning channel 91. The check valve 93 may be installed to allow water or air to flow from the water supply channel 55 to the discharge channel 61 through the cleaning channel 91.

FIGS. 8 to 16 are view for explaining an operation of the beverage maker according to an embodiment.

The beverage maker may make a beverage in any one of the pair of fermentation modules 1 and 2 or a beverage at the same time in the pair of fermentation modules 1 and 2.

For example, the user may use different types of beverages in the first fermentation module 1 and the second fermentation module 2 by changing the ingredient containers C1, C2, and C3 mounted on the ingredient feeder 3.

In addition, the beverage maker may make a beverage in the other fermentation module 2 in the state in which the made beverage is stored in one fermentation module 1. Thus, the user may dispense the beverage stored in the one fermentation module 1 even when fermentation is being performed in the other fermentation module 2.

In addition, the beverage maker may selectively dispense the beverage stored in any one of the pair of fermentation modules 1 and 2 in a state in which the made beverage is stored in the pair of fermentation modules 1 and 2. Thus, the user may selectively dispense and drink different types of beverages stored in the pair of fermentation modules 1 and 2.

For example, ale beer may be made and stored in the first fermentation module 1, and lager beer may be made and stored in the second fermentation module 2. The user may determine a beverage to be dispensed through the input unit 213*b* (see FIG. 1) and selectively dispense the corresponding beverage.

FIGS. 8 to 13 illustrate an operation of the first fermentation module 1. Hereinafter, a description will be given of an operation of making and dispensing beverages in the first fermentation module 1. However, those skilled in the art will be able to easily understand the operation of the second fermentation module 2 through the above-described description.

Figure 8:
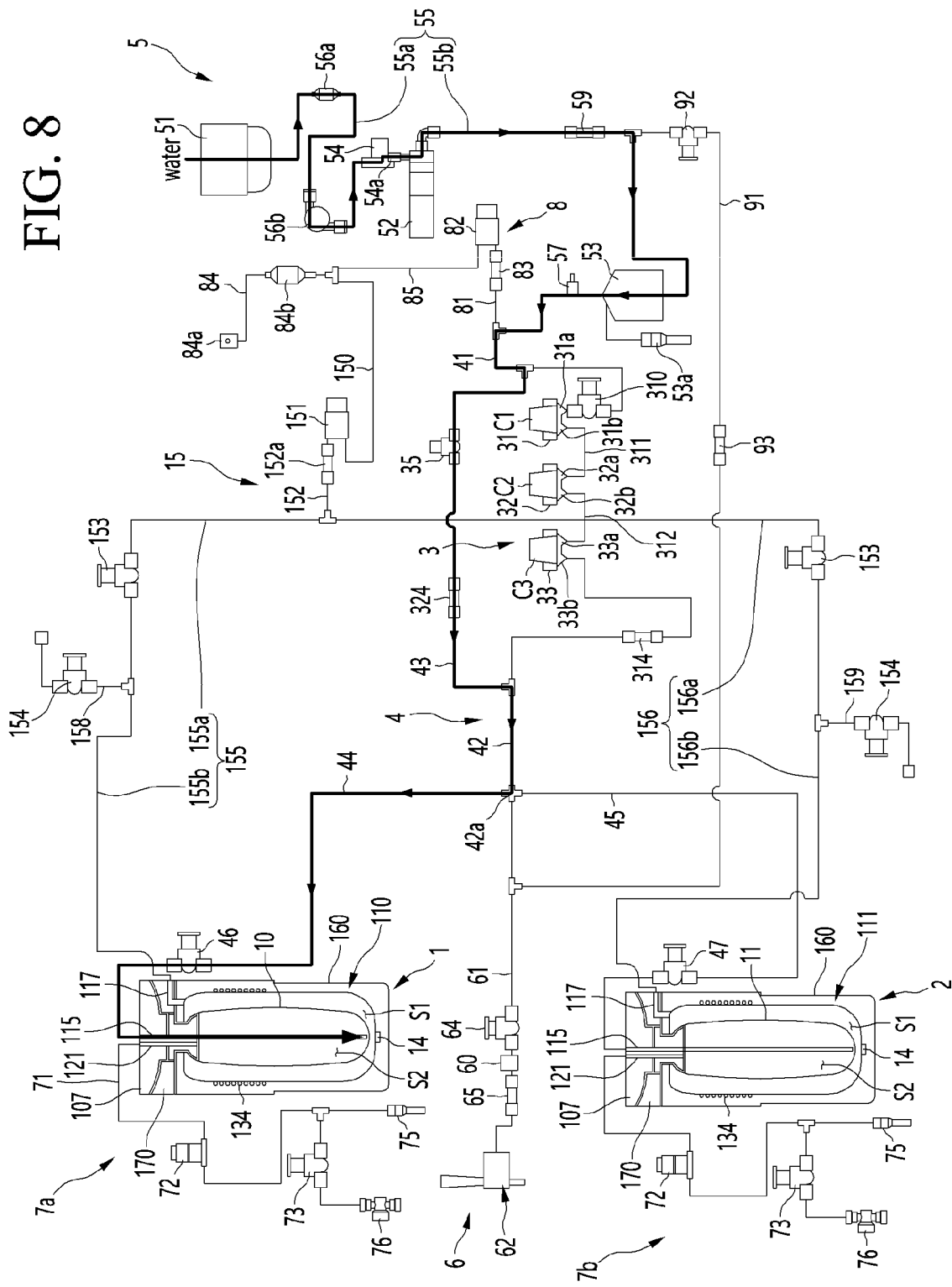
FIGS. 8 to 16 are view for explaining an operation of the beverage maker according to an embodiment.

Referring to FIG. 8, a method for making a beverage using the beverage maker may include a process of supplying hot water to the beverage containers 10 and 11. The process of supplying water may be a process of evenly mixing malt with the hot water within the beverage containers 10 and 11 to generate liquid malt.

In the step of supplying water, the water supply pump 52 and the water supply heater 53 may operate. In addition, the cleaning valve 92, the supply valve 310, and the second main valve 47 may be maintained in the closed state, and the bypass valve 35 and the first main valve 46 may be opened.

Thus, the water in the water tank 51 may flow to the water supply channel 55 by the water supply pump 52 and then be heated by passing through the water supply heater 53. The hot water heated by the water supply heater 53 may sequentially pass through the first main channel 41, the bypass channel 43, the second main channel 42, and the first branch channel 44 and then be introduced into internal space S2 to the first beverage container 10. The hot water may be mixed with the malt contained in the first beverage container 10.

Figure 9:
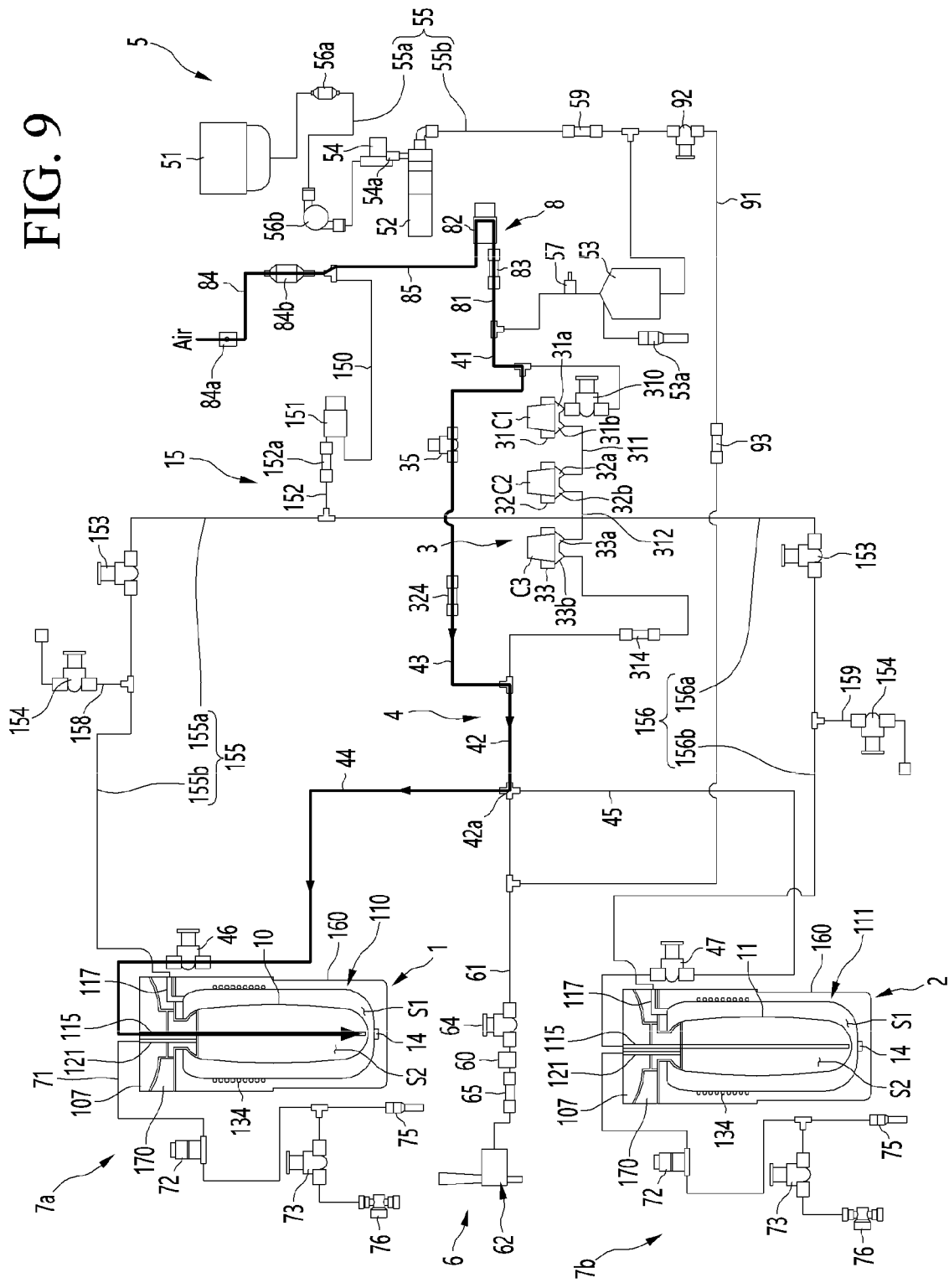

Referring to FIG. 9, the method for making beverages using the beverage maker may include an air supply process of injecting air into the beverage containers 10 and 11. The air supply process may be performed after the water supply process described in FIG. 8 or may be performed alternately with the water supply process.

The air supplying process may be a process of evenly mixing the liquid malt in the beverage containers 10 and 11 or an aeration process of supplying oxygen to the liquid malt.

In the air supply process, the first air pump 82 may operate. In addition, the cleaning valve 92, the supply valve 310, and the second main valve 47 may be maintained in the closed state, and the bypass valve 35 and the first main valve 46 may be maintained in the opened state.

Therefore, the external air may be suctioned into the first air pump 82 by sequentially passing through the suction channel 84 and the first connection channel 85, and the first air pump 82 may inject the air into the air injection channel 81. The air may sequentially pass through the air injection channel 81, the first main channel 41, the bypass channel 43, the second main channel 42, and the first branch channel 44 and then be introduced into the internal space S of the first beverage container 10. The air may agitate the liquid malt contained in the first beverage container 10 or perform aeration.

Figure 10:
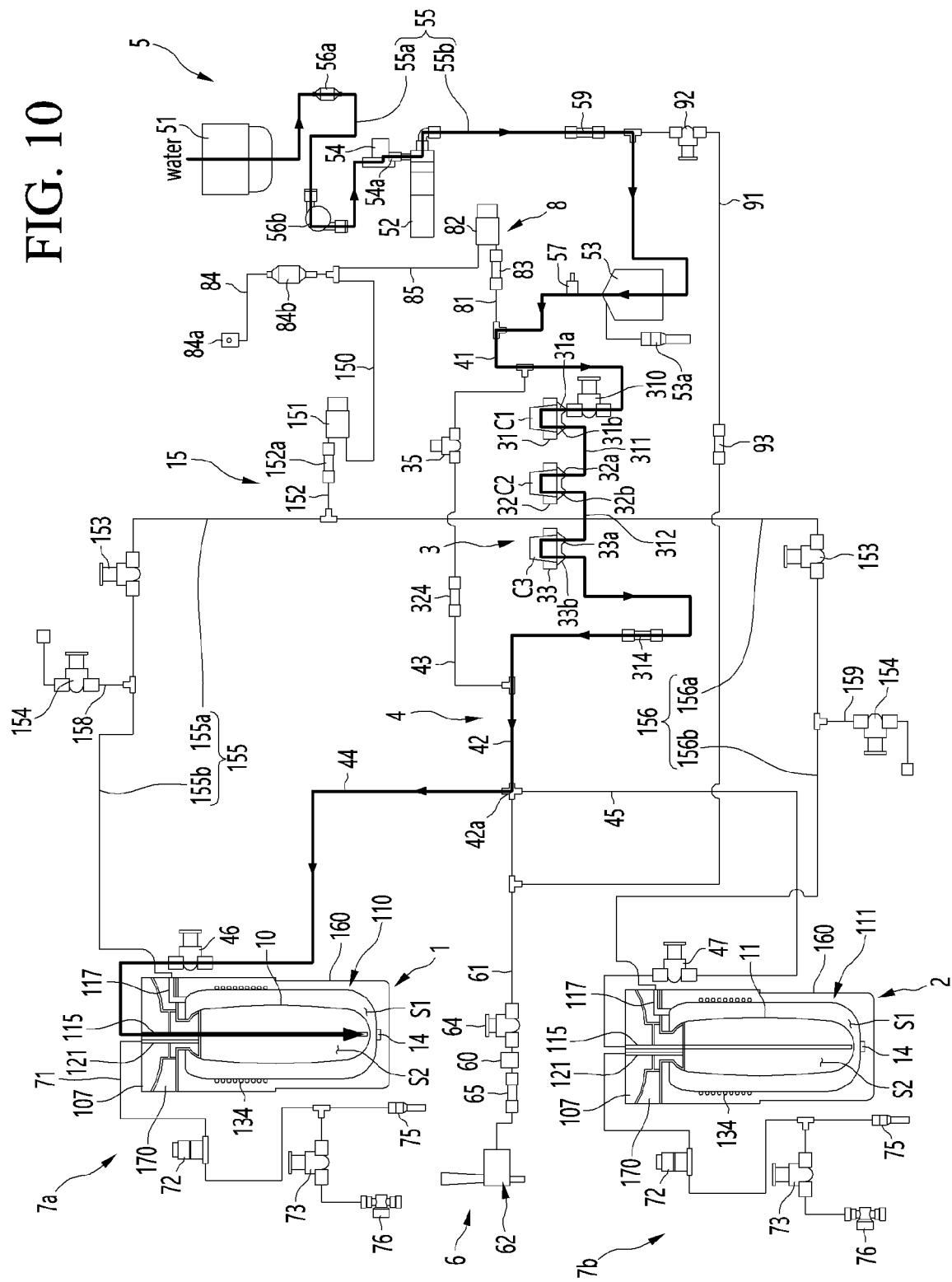

Referring to FIG. 10, the method of making the beverage using the beverage maker may include a process of introducing ingredients. The ingredient input process may be a process of extracting ingredients contained in the ingredient containers C1, C2, and C3 mounted on the ingredient feeder 3 to supply the ingredients to the beverage containers 10 and 11.

The ingredient input process may be performed after the water supply process described in FIG. 8 and the air supply process described in FIG. 9. The ingredient input process may be performed in a state in which the internal temperature of the fermenter 10 is adjusted to a temperature at which the ingredients are capable of being fermented by the evaporation tube 134.

Hereinafter, a case in which three ingredient containers C1, C2, and C3 are mounted on the ingredient feeder 3 will be described as an example.

In the ingredient input process, the water supply pump 52 may operate. In addition, the cleaning valve 92, the bypass valve 35, and the second main valve 47 may be maintained in the closed state, and the supply valve 310 and the first main valve 46 may be opened.

Thus, the water in the water tank 51 pumped by the water supply pump 52 may sequentially pass through the water supply channel 55 and the first main channel 41 and then be introduced into the first ingredient container C1. The water introduced into the first ingredient container C1 may be mixed with a first ingredient (e.g., yeast) contained in the first ingredient container C1 and then flow to the first connection channel 311 together with the first ingredient.

The fluid (a mixture of the water and the first ingredient) introduced into the second ingredient container C2 through the first connection channel 311 may be mixed with a second ingredient (e.g., Hop) contained in the second ingredient container C2 and then flow to the second connection channel 312 together with the second ingredient.

The fluid (a mixture of the water, the first ingredient, and the second ingredient) introduced into the third ingredient container C3 through the second connection channel 312 may be mixed with a third ingredient (e.g., oil) and then flow to the second main channel 42 together with the third ingredient.

The fluid (a mixture of the water, the first ingredient, second ingredient, and the third ingredient) flowing into the second main channel 42 may pass through the first branch channel 44 and the be introduced into the internal space of the first beverage container 10. The fluid may be mixed with the liquid malt contained in the first beverage container 10.

Figure 11:
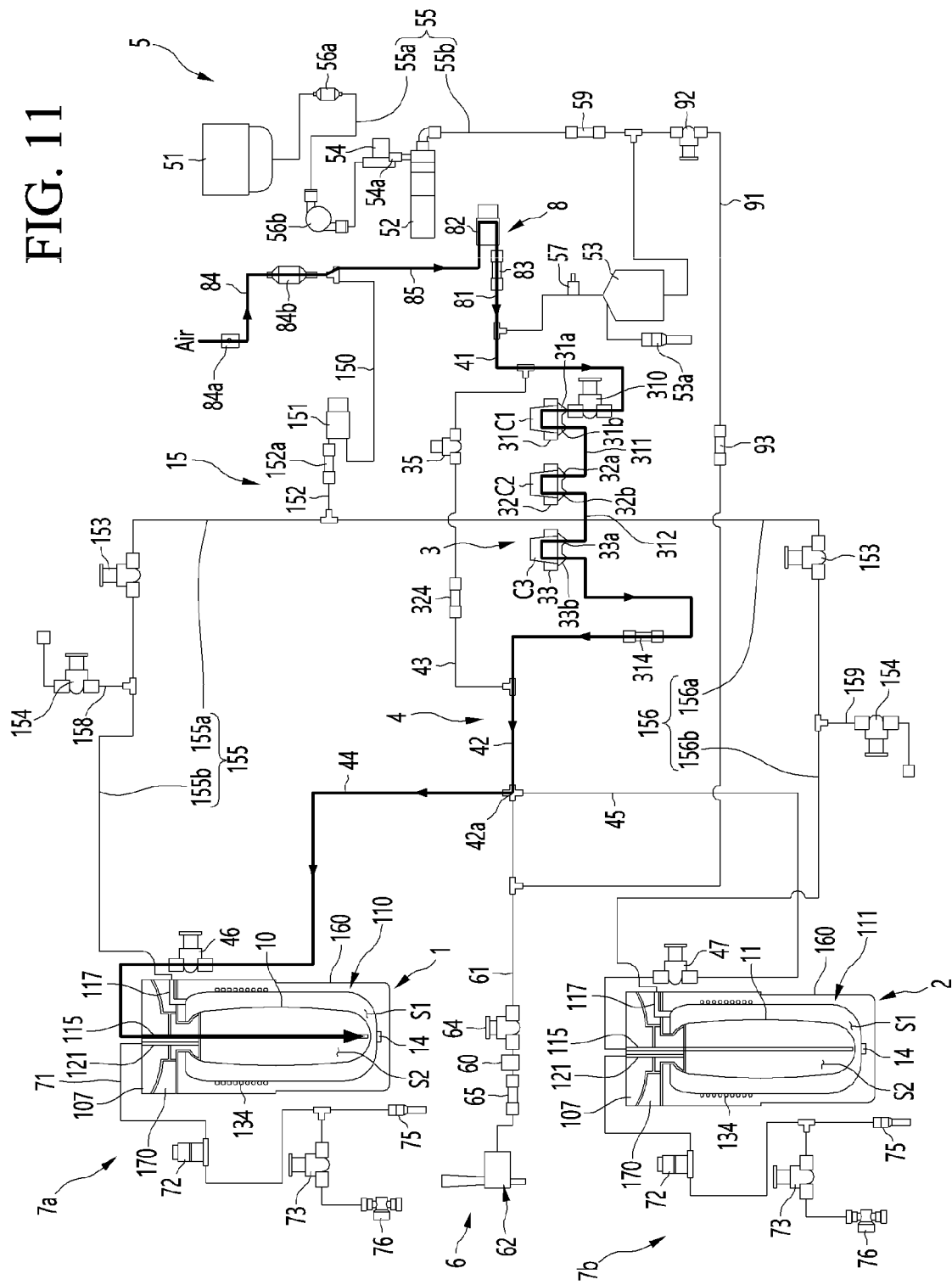

Referring to FIG. 11, the method for making the beverage using the beverage maker may include a residual water removal process. The residual water removal process may be a process of removing residual water remaining in the ingredient containers C1, C2, and C3 mounted on the ingredient feeder 3.

The residual water removal process may be performed after the above-described ingredient input process described in FIG. 10.

In the residual water removal process, the first air pump 82 may operate. In addition, the cleaning valve 92, the bypass valve 35, and the second main valve 47 may be maintained in the closed state, and the supply valve 310 and the first main valve 46 may be opened.

Therefore, the external air may be suctioned into the first air pump 82 by sequentially passing through the suction channel 84 and the first connection channel 85, and the first air pump 82 may inject the air into the air injection channel 81. The air may sequentially pass through the air injection channel 81, the first main channel 41, the first ingredient container C1, the first connection channel 311, the second beverage container C2, the second connection channel 312, the third ingredient container C3, the second main channel 42, and the first branch channel 44 and then be introduced into the internal space S2 of the first beverage container 10. In this process, the residual water remaining in the ingredient containers C1, C2, and C3 may flow into the internal space S2 of the first beverage container 10 together with the air.

Figure 12:
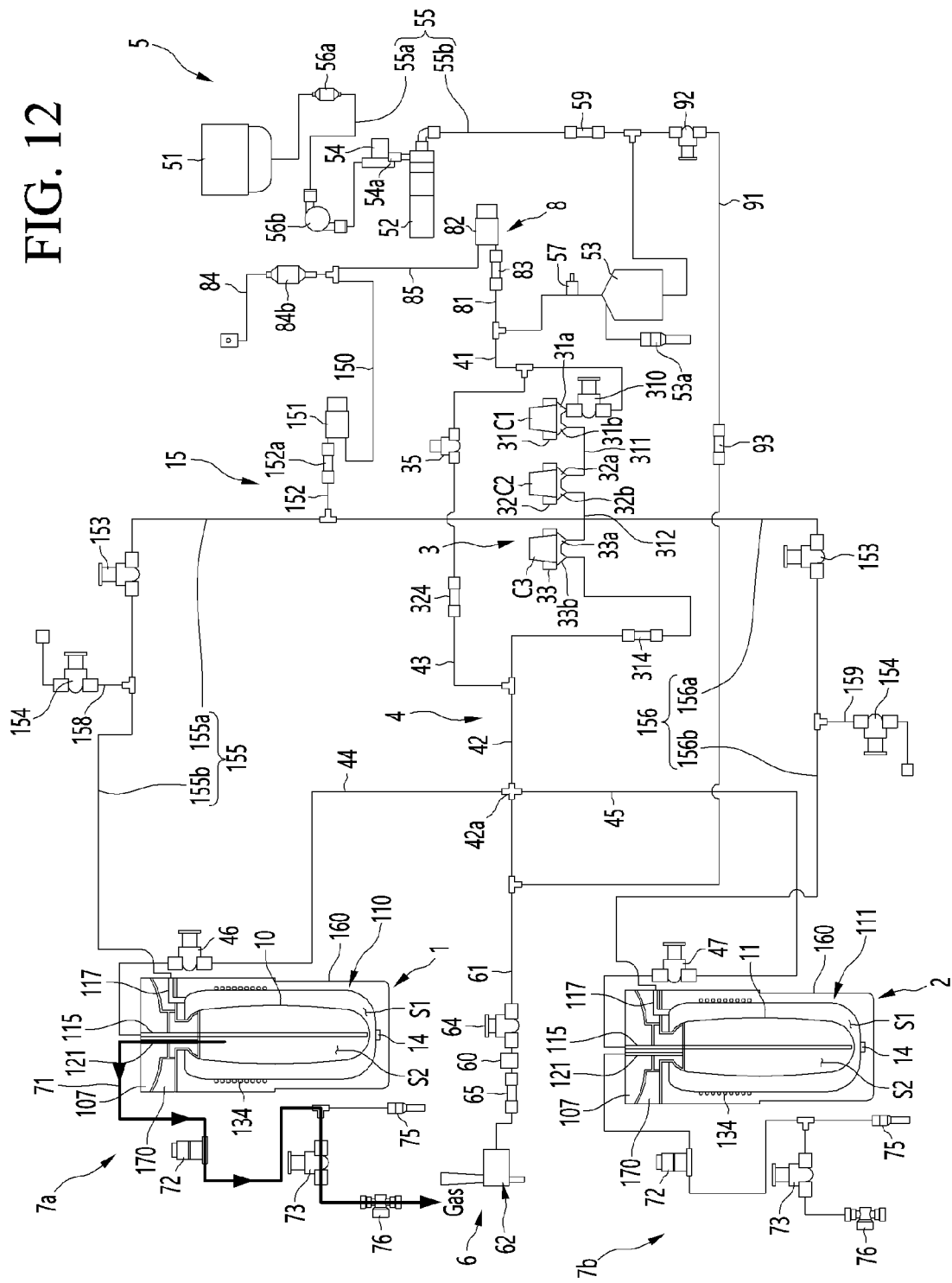

Referring to FIG. 12, the method for making the beverage using the beverage maker may include a fermentation process in which the fermentation proceeds in the internal space S2 of the beverage containers 10 and 11.

The fermentation process may be performed after the above-described ingredient input process described in FIG. 10. When the residual water removal process of FIG. 11 is performed, the fermentation process may be performed after the residual water removal process.

In the fermentation process, the first main valve 46 may be maintained in the closed state. In addition, a temperature of the fermenter 110 of the first fermentation module may be appropriately regulated by at least one of the evaporation tube 134 or the heater 14.

In the fermentation process, an internal pressure of the first beverage container 10 may be appropriately regulated by the first gas exhauster 7a. The pressure sensor 72 of the first gas exhauster 7a may sense the internal pressure of the first beverage container 10 in a state in which the gas exhaust valve 73 is closed.

In the fermentation process, the gas exhaust valve 73 of the first gas exhauster 7a may be opened and closed at least once.

In more detail, when the fermentation proceeds in the first beverage container 10, a gas may be generated to increase in internal pressure of the first beverage container 10. When the internal pressure of the first beverage container 10 is higher than a preset pressure, the gas exhaust valve 73 may be opened. Thus, the gas in the first beverage container 10 may be exhausted to the outside through the gas exhaust channel 71.

During the fermentation process of the first fermentation module 1, the beverage may be made in the second fermentation module 2.

In more detail, after the fermentation process of the first fermentation module 1 is started, the user may withdraw the ingredient container C1, C2, and C3 from which the ingredients have already been extracted from the ingredient feeder 3 and may mount the ingredient containers C1, C2, and C3, in which different types of beverages are capable of being made, on the ingredient feeder 3. Thereafter, in the second fermentation module 2, the water supply process, the air injection process, the ingredient input process, the residual water removal process, and the fermentation process described above may be performed.

Figure 13:
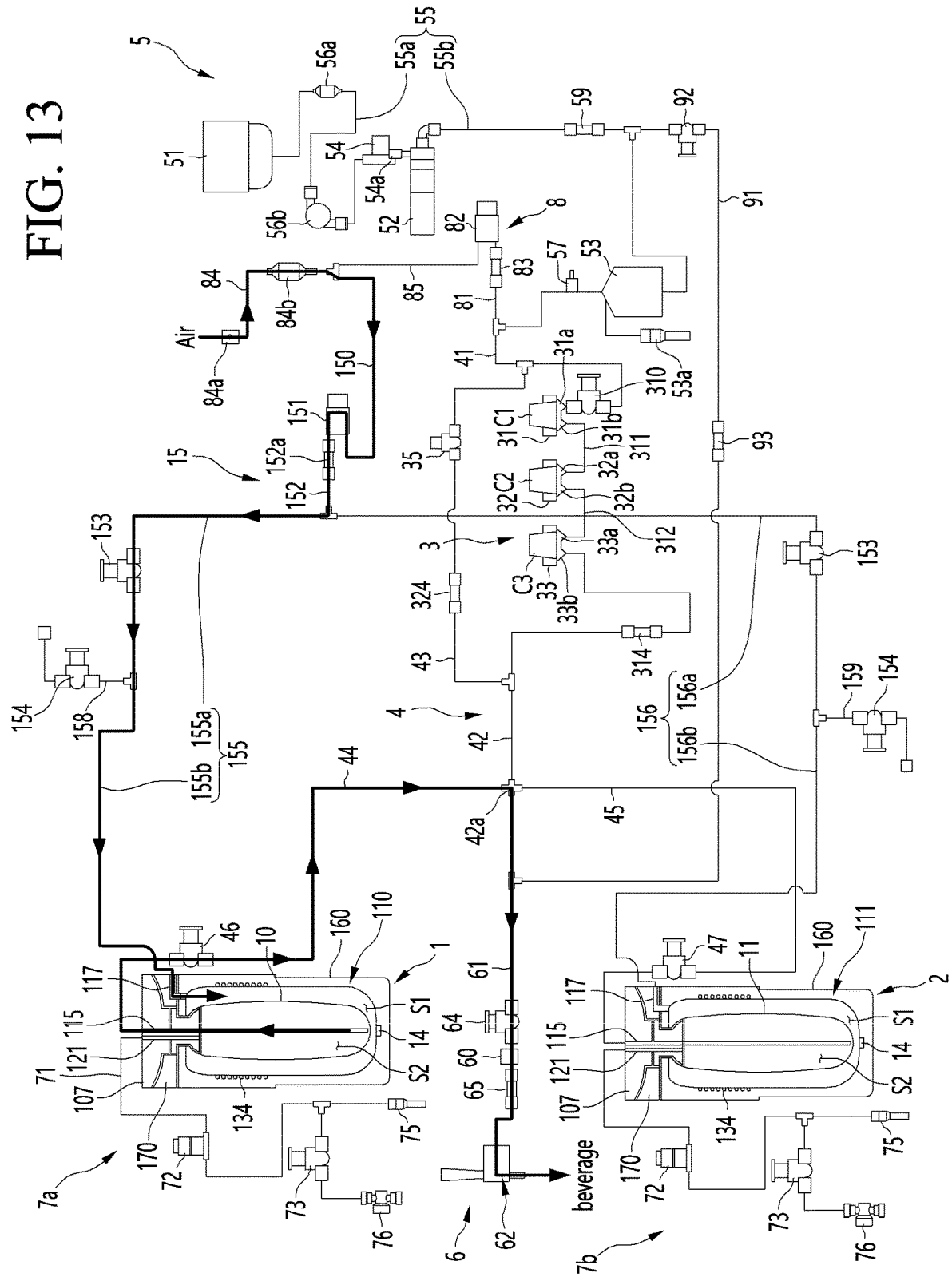

Referring to FIG. 13, the beverage maker may perform a dispensing process of dispensing the beverage that has been made and stored.

Hereinafter, a case of dispensing the beverage contained in the first beverage container 10 will be described as an example.

While the beverage is being stored, the user may dispense the beverage by manipulating the dispenser 62. The beverage contained in the first beverage container 10 may be contracted by the pressure between the inner wall of the fermenter 110 of the first fermentation module 1 and the first beverage container 10, that is, the internal pressure of the fermenter 110 and then be dispensed. For this, when storing the beverages, the air regulator 15 may maintain the internal pressure of the fermenter 110 of the first fermentation module 1 above a preset pressure.

In more detail, when the internal pressure of the fermenter 110 is less than the preset pressure due to the partial dispensing of the beverage, the second air pump 151 may operate. In addition, the air supply valve 153 of the first air branch channel 155 may be opened, and the exhaust valve 154 of the first exhaust channel 158 may be maintained in the closed state.

Thus, the external air may be suctioned into the second air pump 151 by sequentially passing through the suction channel 84 and the second connection channel 150, and the second air pump 151 may inject the air into the air supply channel 152. The air may pass through the first air branch channel 155 to flow into between the inner wall of the fermenter 110 and the outer surface of the first beverage container 10. Thus, the internal pressure of the fermenter 110 may be maintained above the preset pressure.

When the user pulls the lever of the dispenser 62, the first main valve 46 and the dispensing valve 64 may be opened. At this time, the second main valve 47 may be maintained in the closed state.

Thus, the first beverage container 10 may be contracted by the internal pressure of the fermenter 110, and the beverage contained in the first beverage container 10 may be dispensed to the dispenser 62 by sequentially passing through the first branch channel 44 and the dispensing channel 61.

When the user allows the lever of the dispenser 62 to return to its original position, the first main valve 46 and the dispensing valve 64 may be closed. In addition, as described above, the air regulator 15 may maintain the internal pressure of the fermenter 110 of the first fermentation module 1 above the preset pressure.

Figure 14:
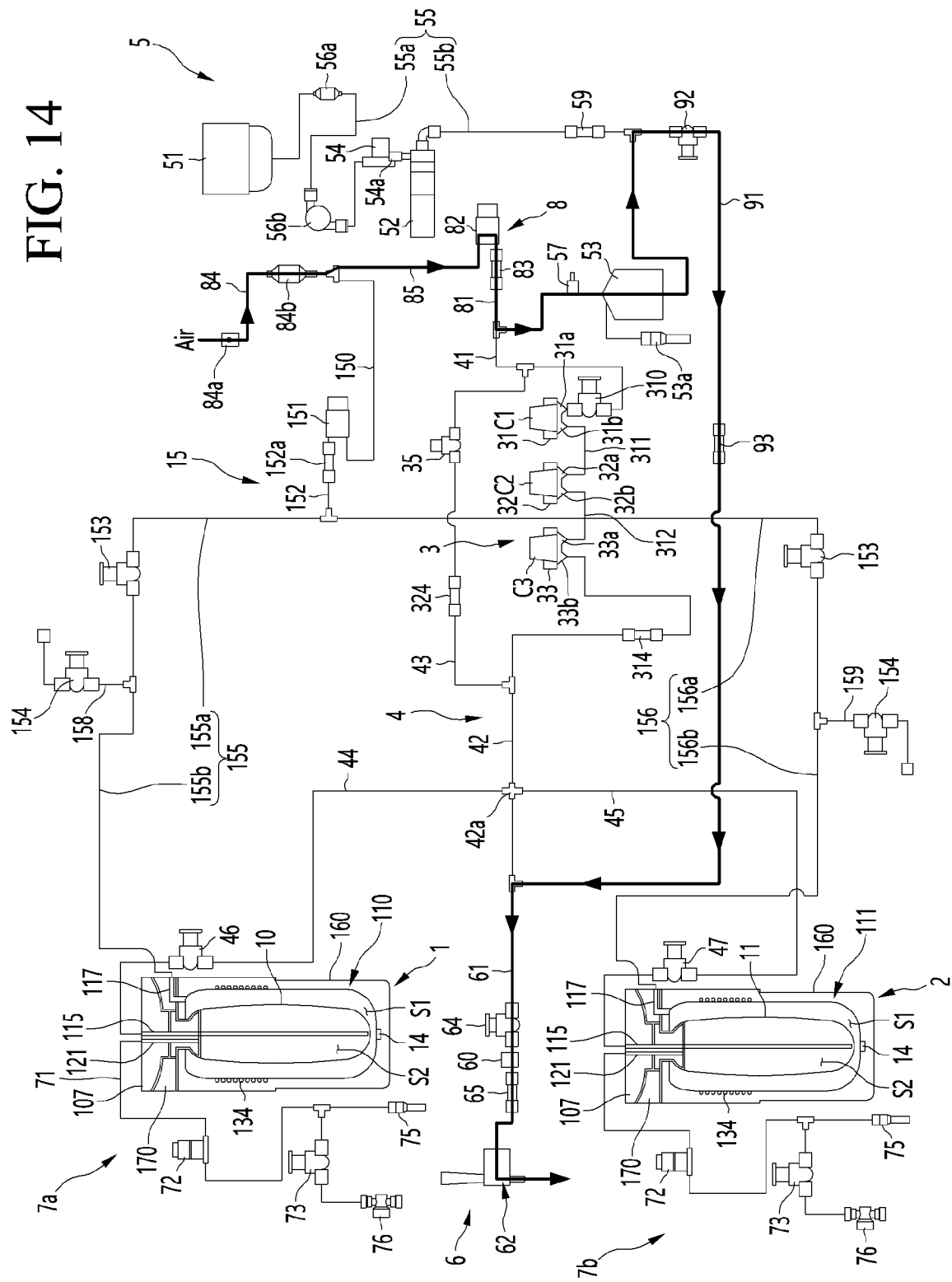
Figure 15:
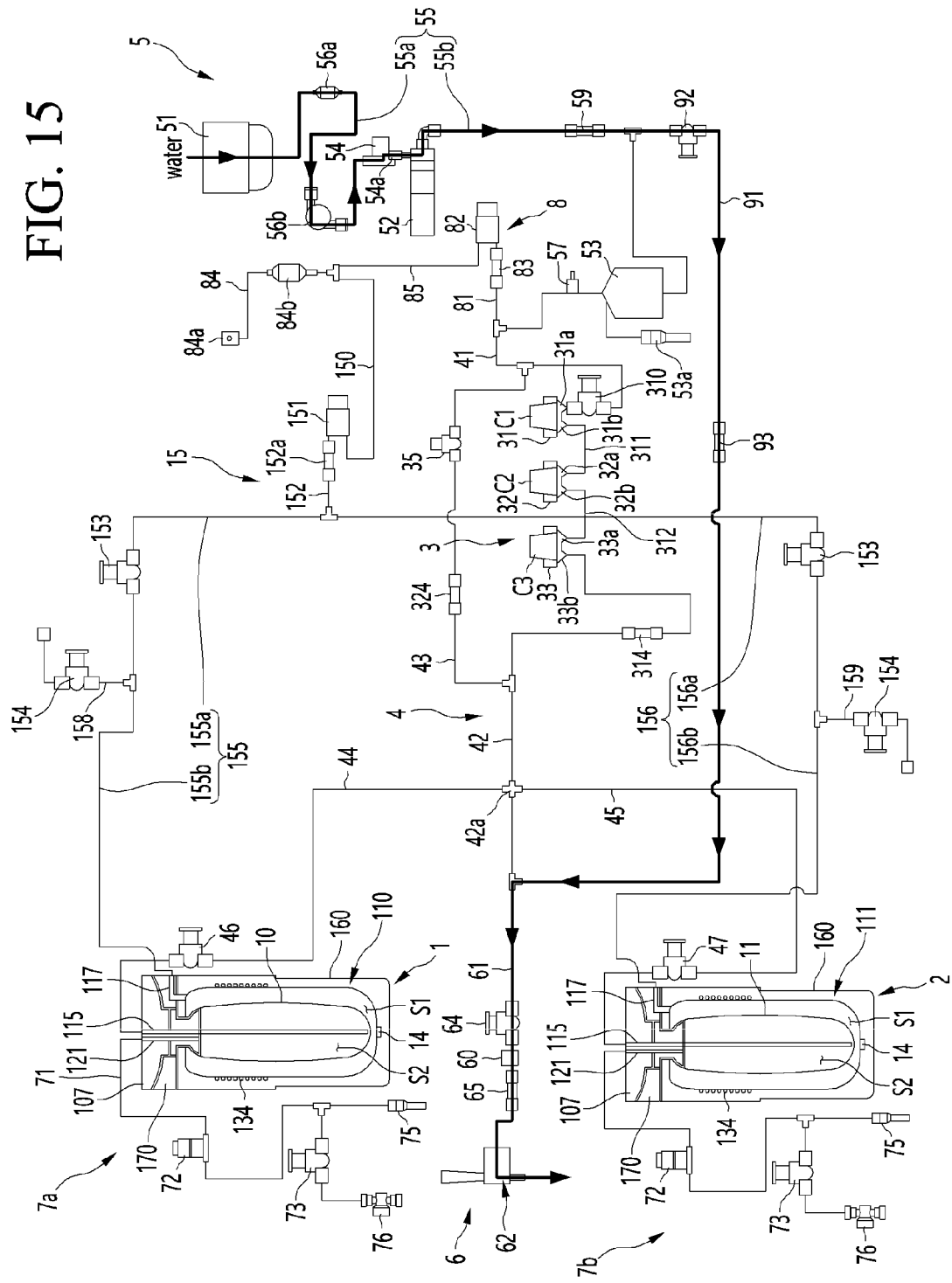

Referring to FIGS. 14 and 15, the beverage maker may perform a dispenser cleaning process of cleaning the beverage dispenser 6. The dispenser cleaning process may be referred to as a dispenser cleaning process.

For example, the process of cleaning the dispenser may be performed after the beverage is dispensed at least once from the beverage dispenser 7. In more detail, if there is a considerable time interval from the final dispensing process to the next dispensing process, the inside of the beverage dispenser 6 may be contaminated by the beverage remaining in the dispenser 6.

Thus, when the beverage dispensing process is re-implemented after a predetermined time has elapsed from the final beverage dispensing process, the dispenser cleaning process may be performed.

For another example, the process of cleaning the dispenser may be performed when a beverage that is different from the beverage that is previously dispensed from the beverage dispenser 7, is dispensed. In more detail, when a second type beverage (e.g., lager) is dispensed from another beverage container 11 after a first type beverage (e.g., ale) is dispensed from the one drink container 10, the second type beverage may be mixed with the first type beverage remaining in the beverage dispenser 6 to deteriorate taste of the second type beverage.

Thus, when a beverage that is different from the beverage dispensed in the final beverage dispensing process is dispensed, the dispenser cleaning process may be performed.

To clean the beverage dispenser 6, since a fluid has to pass through the inside of the beverage dispenser, the user may initiate the dispenser cleaning process by pulling the lever of the dispenser 62. That is, the dispenser cleaning process may be performed in a state in which the dispensing valve 64 is opened.

The dispenser cleaning process may include at least one of an air cleaning process (see FIG. 14) or a water cleaning process (see FIG. 15).

The air cleaning process and the water cleaning process may be performed in a predetermined order, or only one of the two processes may be performed alone. For example, when simple cleaning of the beverage dispenser 7 is required, only the air cleaning process may be performed alone. When complete cleaning of the beverage dispenser 7 is required, the water cleaning process and the air cleaning process may be sequentially performed.

In the air cleaning process, the first air pump 82 may operate. In addition, each of the supply valve 310 and the bypass valve 35 may be maintained in the closed state, and the cleaning valve 92 may be opened. At this time, the dispensing valve 64 is in the opened state.

Therefore, the external air may be suctioned into the first air pump 82 by sequentially passing through the suction channel 84 and the first connection channel 85, and the first air pump 82 may inject the air into the air injection channel 81. The air may be discharged to the dispenser 62 by sequentially passing through the cleaning channel 91 and the dispensing channel 61. During this process, the beverage remaining in the beverage dispenser 6 may be discharged to the dispenser 62 together with the air. As a result, the inside of the beverage dispenser 7 may be cleaned by the air.

In addition, since the water supply heater 53 is disposed between the air injection channel 81 and the cleaning channel 91 with respect to the water supply channel 55, the air may pass through the water supply heater 53. Thus, the air may also remove residual water remaining in the water supply heater 53.

In the water cleaning process, the water supply pump 52 may operate. In addition, each of the supply valve 310 and the bypass valve 35 may be maintained in the closed state, and the cleaning valve 92 may be opened. At this time, the dispensing valve 64 is in the opened state.

Thus, the water in the water tank 51 may flow to the water supply channel 55 by the water supply pump 52. The water may be discharged to the dispenser 62 by sequentially passing through the cleaning channel 91 and the dispensing channel 61. The water discharged to the dispenser 62 may fall into the drip tray 214 (see FIG. 1).

In this process, the beverage remaining inside the beverage dispenser 6 may be discharged to the dispenser 62 together with the water. As a result, the inside of the beverage dispenser 7 may be cleaned by the water.

When the air cleaning process is performed after the water cleaning process, the residual water (cleaning water) remaining in the beverage dispenser 7 may be removed by the air.

Figure 16:
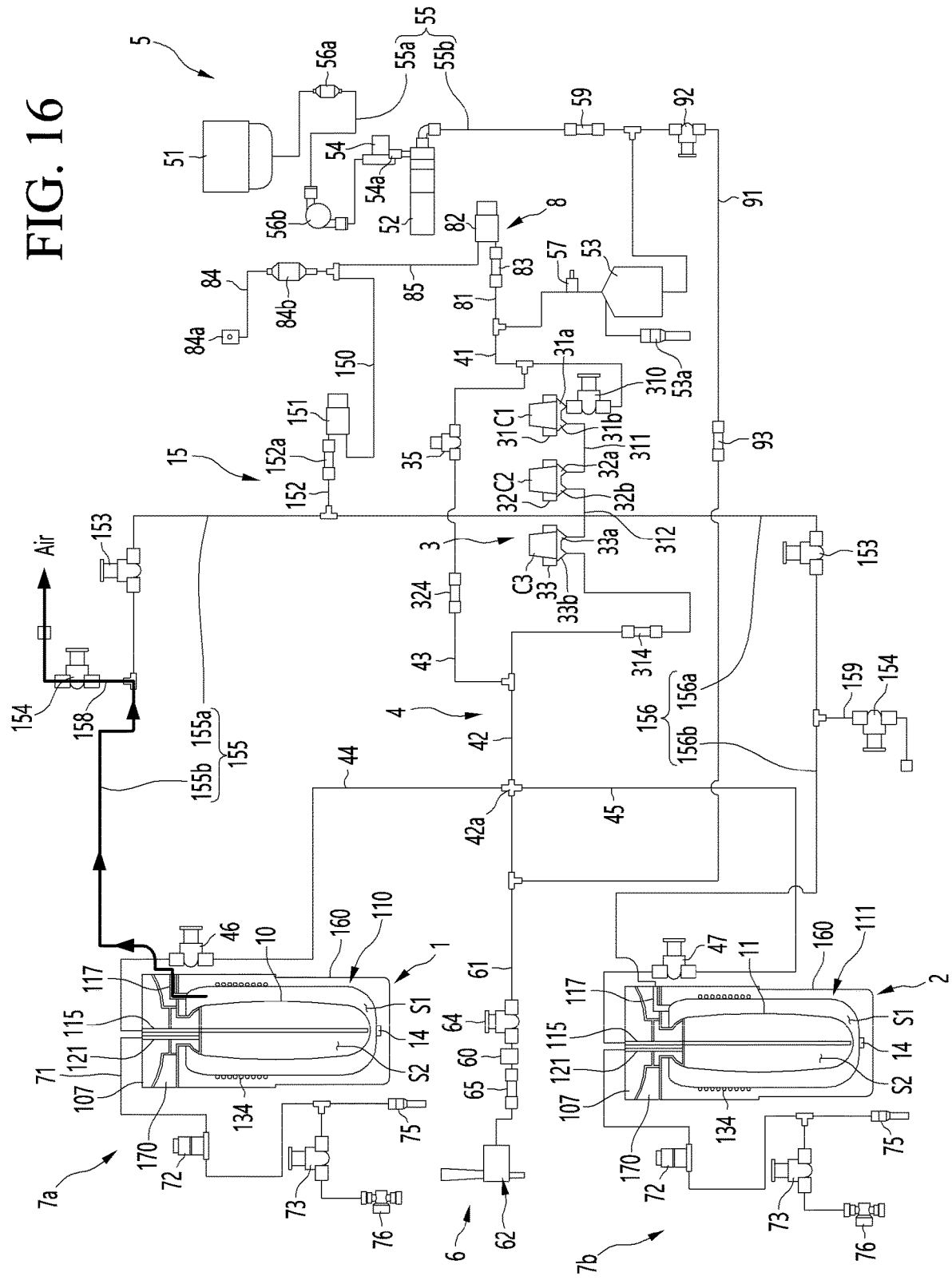

Referring to FIG. 16, the beverage maker may perform a decompression process of reducing the internal pressure of the fermenter 110.

For example, the decompression process may be performed when the user attempts to open the fermenter lid 107 after the beverage has been made. For another example, the decompression process may be performed when the beverages in the beverage containers 10 and 11 are exhausted.

If the user opens the fermenter lid 107 in a state in which the internal pressure of the fermenter is higher than atmospheric pressure, the beverage containers 10 and 11 may bounce to an upper side of the fermenter 110 due to a pressure difference. On the other hand, if the decompression process is performed before the user opens the fermenter lid 107, the beverage containers 10 and 11 may not bounce upward and be maintained inside the fermenter 110 when the fermenter lid 107 is opened. That is, the user may safely withdraw the beverage containers 10 and 11 from the fermenter 110.

Hereinafter, a case of reducing the internal pressure of the fermenter 110 of the first fermentation module 1 will be described as an example.

In the decompression process, the air supply valve 153 of the first air branch channel 155 may be maintained in the closed state, and the exhaust valve 154 of the first exhaust channel 158 may be opened.

Thus, the air between the inner wall of the fermenter 110 and the outer surface of the first beverage container 10 may be exhausted by sequentially passing through the second channel 155b of the first air branch channel 155 and the first exhaust channel 158 by the pressure difference between the inner pressure of the fermenter 110 and the atmospheric pressure. As a result, the internal pressure of the fermenter 110 may be reduced to the atmospheric pressure level.

The above-disclosed subject matter is to be considered illustrative, and not restrictive, and the appended claims are intended to cover all such modifications, enhancements, and other embodiments, which fall within the scope of the present disclosure.

Thus, the embodiment of the present disclosure is to be considered illustrative, and not restrictive.

Therefore, the scope of the present disclosure is defined not by the detailed description of the invention but by the appended claims, and all differences within the scope will be construed as being included in the present disclosure.

What is claimed is:

1. A beverage maker comprising:
  a pair of fermenters, each of which has an internal space;
  a pair of fermenter lids configured to shield the internal spaces of the pair of fermenters;
  a pair of beverage containers that are selectively accommodated in the internal spaces of the pair of fermenters;
  a temperature regulator configured to independently regulate internal temperatures of the pair of fermenters;
  an ingredient feeder in which ingredient containers configured to contain beverages are selectively mounted, the ingredient feeder being disposed outside the pair of fermenters;
  a main channel that passes through the ingredient feeder;
  a pair of branch channels branched from the main channel and respectively connected to the pair of beverage containers;
  a beverage dispenser connected to the pair of branch channels;
  a water tank disposed behind the pair of fermenters;
  a water supply pump configured to supply water stored in the water tank to the main channel;
  a water supply heater configured to heat the water supplied by the water supply pump; and
  a back cover that is disposed behind the pair of fermenters, and the water tank is detachably mounted on the back cover,
  wherein the back cover comprises:
    an upper cover portion disposed in front of the water tank, and
    a lower cover portion stepped backward with respect to the upper cover portion and configured to support the water tank at a lower side.

2. The beverage maker according to claim 1, wherein the ingredient feeder is disposed between the pair of fermenters.

3. The beverage maker according to claim 1, further comprising:
  an air pump;
  an air supply channel connected to the air pump; and
  a pair of air branch channels branched from the air supply channel and respectively connected to the pair of fermenters,
  wherein each of the pair of beverage containers is made of a flexible ingredient, and
  wherein each of the pair of air branch channels is configured to guide air between an inner wall of one of the pair of fermenters and an outer surface of one of the pair of beverage containers.

4. The beverage maker according to claim 3, further comprising a pair of exhaust channels branched from the pair of air branch channels, each of the pair of exhaust channels being configured to exhaust the air between the inner wall of one of the pair of fermenters and the outer surface of one of the pair of beverage containers.

5. The beverage maker according to claim 1, further comprising a pair of gas exhausters configured to exhaust gases within the pair of beverage containers.

6. The beverage maker according to claim 1, wherein at least one of the water supply pump or the water supply heater is disposed between the pair of fermenters and disposed under the ingredient feeder.

7. The beverage maker according to claim 1, wherein the temperature regulator comprises:
  a compressor;
  a condenser configured to condense a refrigerant compressed in the compressor; and
  a pair of evaporation tubes that are wound around outer circumferences of the pair of fermenters, respectively and configured to divide and carry the refrigerant condensed in the condenser.

8. The beverage maker according to claim 7, wherein the back cover defines a machine room that accommodates the compressor and the condenser.

9. The beverage maker according to claim 1, further comprising an air pump configured to inject air into the main channel, disposed under the ingredient feeder, and disposed between the pair of fermenters.

10. The beverage maker according to claim 1, further comprising a center cover configured to cover a space between the pair of fermenters at a front side.

11. The beverage maker according to claim 10, wherein the beverage dispenser comprises:
   a dispenser mounted on the center cover; and
   a dispensing channel configured to connect the pair of branch channels to the dispenser.

12. The beverage maker according to claim 1, further comprising a cleaning channel configured to guide water or air to the beverage dispenser by bypassing the main channel and the pair of branch channels.

13. The beverage maker according to claim 12, further comprising a controller configured to, based on the beverage contained in one of the pair of beverage containers being dispensed to the beverage dispenser, clean the beverage dispenser through the cleaning channel before the beverage contained in the other of the pair of beverage containers is dispensed to the beverage dispenser.

14. The beverage maker according to claim 1, wherein each of the pair of branch channels is configured to:
   guide a fluid within the main channel to one of the pair of beverage containers, and
   guide a beverage within the one of the pair of beverage containers to the beverage dispenser after the beverage is completely made.

15. The beverage maker according to claim 1, further comprising:
   a pair of main valves configured to open and close the pair of branch channels, respectively; and
   a controller configured to control the pair of main valves so that a fluid within the main channel selectively flows to the pair of branch channels.

16. A beverage maker comprising:
   a base;
   a first beverage fermenter and a second beverage fermenter, that are spaced apart from each other, that are disposed above the base, and that are capable of being independently regulated in temperature;
   a first beverage container selectively accommodated in the first beverage fermenter;
   a second beverage container selectively accommodated in the second beverage fermenter;
   an ingredient feeder in which ingredient containers configured to contain beverages are selectively mounted, the ingredient feeder being disposed outside the first beverage fermenter and the second beverage fermenter;
   a main channel configured to guide water or air via the ingredient feeder;
   a first branch channel branched from the main channel and connected to the first beverage container;
   a second branch channel branched from the main channel and connected to the second beverage container;
   a beverage dispenser connected to the first branch channel and the second branch channel;
   a water tank disposed behind the first beverage fermenter and the second beverage fermenter; and
   a back cover which is disposed behind the first beverage fermenter and the second beverage fermenter, and the water tank is detachably mounted on the back cover,
   wherein the back cover comprises:
      an upper cover portion disposed in front of the water tank, and
      a lower cover portion stepped backward with respect to the upper cover portion and configured to support the water tank at a lower side.

17. The beverage maker according to claim 16, wherein the first beverage fermenter and the second beverage fermenter are disposed symmetrically with respect to the ingredient feeder.

* * * * *